US012625457B2

(12) United States Patent
Horikawa

(10) Patent No.: US 12,625,457 B2
(45) Date of Patent: May 12, 2026

(54) MEDIUM TRANSPORT APPARATUS

(71) Applicant: Oki Electric Industry Co., Ltd., Tokyo (JP)

(72) Inventor: Naruhiko Horikawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/945,249

(22) Filed: Nov. 12, 2024

(65) Prior Publication Data

US 2025/0271810 A1 Aug. 28, 2025

(51) Int. Cl.
*G03G 21/16* (2006.01)
*G03G 15/00* (2006.01)

(52) U.S. Cl.
CPC ..... *G03G 21/1638* (2013.01); *G03G 15/6529* (2013.01); *G03G 15/6552* (2013.01); *G03G 21/1647* (2013.01)

(58) Field of Classification Search
CPC ........... G03G 21/1633; G03G 21/1647; G03G 21/1676; G03G 21/1842; G03G 2221/1687; G03G 2221/1684; G03G 2221/169; G03G 21/1628
See application file for complete search history.

(56) References Cited

U.S. PATENT DOCUMENTS

| | | | | |
|---|---|---|---|---|
| 2007/0065174 A1* | 3/2007 | Rennick | G03G 21/1638 | 399/110 |
| 2008/0170887 A1* | 7/2008 | Nishimura | G03G 21/1647 | 399/262 |
| 2008/0170889 A1* | 7/2008 | Eto | G03G 15/0877 | 399/263 |
| 2011/0229192 A1 | 9/2011 | Okamoto | | |
| 2013/0071139 A1 | 3/2013 | Fukao | | |
| 2021/0026289 A1 | 1/2021 | Ushikubo | | |
| 2021/0116846 A1* | 4/2021 | Totsuka | G03G 21/1842 | |

FOREIGN PATENT DOCUMENTS

| | | |
|---|---|---|
| JP | 2007-065125 A | 3/2007 |
| JP | 2021032974 A | 3/2021 |

* cited by examiner

*Primary Examiner* — Jessica L Eley
(74) *Attorney, Agent, or Firm* — Rabin & Berdo, P.C.

(57) ABSTRACT

A medium transport apparatus includes an apparatus body provided with a medium transport path, first and second components disposed in the apparatus body, a first cover covering a first area in which the first component is housed, a second cover covering a second area in which the second component is housed, a first coupling portion coupling both covers, and a second coupling portion coupling the apparatus body and the second cover. The second cover has a wall portion located between the first and second areas in a state where the first cover opened and the second cover are closed. In a state where the first cover is opened, the first component is attachable and detachable while the wall portion restricts access to the second area. In a state where the second cover is opened, the first component and the second component are attachable and detachable.

13 Claims, 22 Drawing Sheets

MEDIUM TRANSPORT APPARATUS

BACKGROUND OF THE INVENTION

1. Field of the Invention

The present disclosure relates to a medium transport apparatus that has the function of transporting media.

2. Description of the Related Art

Conventionally, there is an apparatus in which a top cover is openable and closable with respect to an apparatus body (main body) in order to replace components or perform maintenance of the apparatus. See Japanese Patent Application Publication No. 2007-65125 (see Abstract).

However, when there is not enough space above the apparatus, the top cover cannot be fully opened. For this reason, it is necessary to pull the apparatus out of the narrow space before opening the top cover. Thus, the operational burden on users is large.

The present disclosure is made to solve the above-described problem, and an object of the present disclosure is to enable the replacement of components or maintenance within a narrow space to thereby reduce the operational burden on users.

SUMMARY OF THE INVENTION

A medium transport apparatus of the present disclosure includes an apparatus body in which a medium transport path is provided, a first component and a second component that are disposed in the apparatus body, a first cover covering a first area in which the first component is housed, a second cover covering a second area in which the second component is housed, a first coupling part coupling the first cover and the second cover and supporting the first cover so that the first cover is openable and closable with respect to the first area, and a second coupling part coupling the apparatus body and the second cover and supporting the second cover so that the second cover is openable and closable with respect to the second area. The second cover has a wall portion located between the first area and the second area in a state where the first cover is opened and the second cover is closed. When the first cover is opened, the first component in the first area is attachable and detachable while access to the second area is restricted by the wall portion. Furthermore, when the second cover is opened, the first component in the first area and the second component in the second area are attachable and detachable.

According to the present disclosure, even when the medium transport apparatus is disposed in a narrow space, the first component becomes attachable and detachable by opening the first cover. Further, by opening the second cover, both the first component and the second component become attachable and detachable. Thus, the operational burden on users can be reduced.

DETAILED DESCRIPTION OF THE INVENTION

<Image Forming Apparatus>

Figure 1:
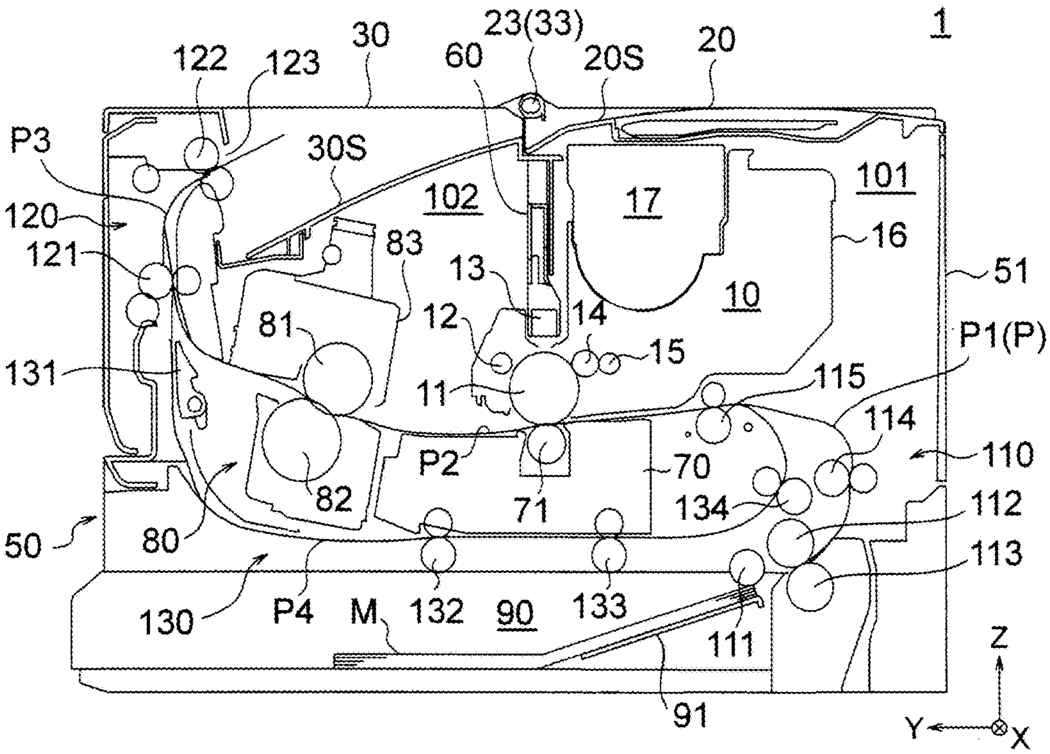
FIG. 1 is a diagram illustrating an internal configuration of an image forming apparatus as a medium transport apparatus of an embodiment.

An image forming apparatus 1 will be described as an example of a medium transport apparatus of an embodiment. FIG. 1 is a diagram illustrating an internal configuration of the image forming apparatus 1. In a particular example, the image forming apparatus 1 is configured as an electrophotographic printer that forms images using an electrophotographic process. The medium transport apparatus is not limited to the image forming apparatus 1, but may be any device that transports media and performs some processing thereon.

The image forming apparatus 1 includes a medium cassette 90 that stores media M such as printing sheets, a medium feeding section 110 that feeds a medium M stored in the medium cassette 90, an ID (image drum) unit 10 as an image forming unit that forms an image, a transfer unit 70 that transfers the image to the medium M, a fixing unit 80 that fixes the image to the medium M, a medium ejection section 120 that ejects the medium M, and a housing 50 as an apparatus body that houses these components.

A medium transport path P through which a medium M is transported is provided inside the housing 50. The medium transport path P has a feeding transport path P1, a transfer transport path P2, and an ejection transport path P3 in this order from the medium cassette 90 to an ejection port 123 (described later). The image forming apparatus 1 also has a first cover 20 and a second cover 30 which are openable and closable with respect to the housing 50.

The medium cassette 90 stores the media M such as printing sheets. The medium cassette 90 is installed attachably to and detachably from a lower portion of the housing 50. The medium cassette 90 has a placing plate 91 that holds the media M stacked thereon, side guides 92L and 92R (see FIG. 23(B)) that restrict the positions of both ends of the medium M in its width direction, and a rear guide 93 (see FIG. 23(B)) that restricts the position of a rear end of the medium M.

The medium feeding section 110 has a pick-up roller 111, a feeding roller 112, and a separation roller 113. The pick-up roller 111 draws out the media M stored in the medium cassette 90 one by one. The feeding roller 112 and the separation roller 113 separate the drawn media M into each medium M and feed the medium M to the feeding transport path P1.

The medium feeding section 110 also has a pair of intermediate transport rollers 114 and a pair of transport rollers 115, along the feeding transport path P1. The transport rollers 115 are also referred to as registration rollers.

The intermediate transport rollers 114 transport the medium M from the feeding roller 112 and the separation roller 113 to the transport rollers 115 along the feeding transport path P1. The transport rollers 115 correct the skew of the medium M from the intermediate transport rollers 114 and transport the medium M to the transfer unit 70 along the transfer transport path P2.

The ID unit 10 has a photosensitive drum 11 as an image bearing body, a charging roller 12 as a charging member, a developing roller 14 as a developer bearing body, a supply roller 15 as a supply member, a unit body 16 that houses these components, and a toner cartridge 17 as a developer container. The ID unit 10 is also referred to as a processing unit. An LED head 13 as an exposure head (i.e., an exposure section or light emitting section) is disposed to face the photosensitive drum 11.

The photosensitive drum 11 is a cylindrical member that has a photosensitive layer formed on a surface of a conductive support body. The photosensitive layer is a laminated body including charge generation layers and charge transport layers. The photosensitive drum 11 rotates, for example, clockwise in FIG. 1.

The LED head 13 has an LED array in which LEDs (light-emitting diodes) as light-emitting elements are disposed. The LED head 13 also has a lens array. The LED head 13 emits light to the surface of the photosensitive drum 11 so as to form an electrostatic latent image. The LED head 13 is held by a head holder 60 coupled to the second cover 30, as described later.

The charging roller 12 is disposed to contact the surface of the photosensitive drum 11 and rotates following the photosensitive drum 11. The charging roller 12 is applied with a charging voltage, and uniformly charges the surface of the photosensitive drum 11.

The developing roller 14 is disposed to contact the surface of the photosensitive drum 11 and rotates in a direction opposite to the rotational direction of the photosensitive drum 11 (so that the surfaces of the developing roller 14 and the photosensitive drum 11 at a contact portion therebetween move in the same direction). The developing roller 14 is applied with a developing voltage, and develops the electrostatic latent image on the surface of the photosensitive drum 11 with toner.

The supply roller 15 is disposed to contact the surface of the developing roller 14 and rotates in the same direction as the rotational direction of the developing roller 14 (so that the surfaces of the supply roller 15 and the developing roller 14 at a contact portion therebetween move in the opposite directions). The supply roller 15 is applied with a supply voltage, and supplies the toner to the developing roller 14. The developing roller 14 and the supply roller 15 constitute a developing section.

The toner cartridge 17 is a container that stores the toner as a developer and is mounted attachably to and detachably from the unit body 16 of the ID unit 10. The toner cartridge 17 supplies the toner to the developing section which includes the developing roller 14 and the supply roller 15. The toner is, for example, a black toner, but is not limited thereto.

The transfer unit 70 is disposed on the side opposite to the ID unit 10 with respect to the transfer transport path P2. In this example, the transfer unit 70 is disposed on a-Z side (lower side) of the ID unit 10.

The transfer unit 70 has a transfer roller 71 that is in contact with the surface of the photosensitive drum 11. The transfer roller 71 is applied with a transfer voltage, and transfers a toner image on the surface of the photosensitive drum 11 to the medium M passing through between the photosensitive drum 11 and the transfer roller 71. The medium M having passed through between the photosensitive drum 11 and the transfer roller 71 is transferred to the fixing unit 80 along the transfer transport path P2 due to the rotation of the photosensitive drum 11.

Although a configuration that forms a monochromatic image using a single ID unit 10 is described here, this embodiment is not limited to such a configuration. For example, a configuration to form a color image using multiple ID units of yellow, magenta, cyan, black, and the like may be employed.

The fixing unit 80 is disposed downstream of the ID unit 10 in the transport direction of the medium M. The fixing unit 80 has a fixing roller 81 as a fixing member and a pressure roller 82 as a pressurizing member. The fixing roller 81 has therein a heater such as a halogen lamp. The pressure roller 82 is pressed against the fixing roller 81. The fixing roller 81 and the pressure roller 82 heat and pressurize the medium M to fix the toner image onto the medium M.

The medium ejection section 120 has a pair of ejection rollers 121 and a pair of ejection rollers 122, along the ejection transport path P3 from the fixing unit 80 to the ejection port 123. The ejection rollers 121 and 122 transport the medium M, which has passed through the fixing unit 80, along the ejection transport path P3 and eject the medium M through the ejection port 123 as an ejection section.

The ejection port 123 is an opening provided in the housing 50 and is disposed in the −Y direction (rearward) with respect to the second cover 30. The first cover 20 and the second cover 30 have stacker portions 20S and 30S, respectively, on which the media M ejected through the ejection port 123 are placed.

The image forming apparatus 1 may include a re-transport mechanism 130 that re-transports the medium M (to which the toner image has been fixed) to the feeding transport path P1 for double-sided printing. The re-transport mechanism 130 has re-transport rollers 132, 133, and 134 along a return transport path P4 from the downstream side of the fixing unit 80 to the feeding transport path P1.

A switching guide 131 is provided downstream of the fixing unit 80 so as to switch the transport path for the medium M. The switching guide 131 guides the medium M, which has been drawn back from the ejection transport path P3 by the reverse rotation of the ejection rollers 121 and 122, to the return transport path P4.

The re-transport rollers 132, 133, and 134 of the re-transport mechanism 130 transport the medium M along the return transport path P4. The return transport path P4 merges with the feeding transport path P1 on the upstream side of the transport rollers 115. In a case where the image forming apparatus 1 does not have a double-sided printing function, it is not necessary to provide the re-transport mechanism 130.

In FIG. 1, the axial direction of the photosensitive drum 11 is defined as an X direction. The X direction is the axial direction of each roller in the image forming apparatus 1 and is also the width direction of the medium M to be transported. The moving direction of the medium M when the medium M passes through the ID unit 10 is defined as a Y direction. The direction perpendicular to the X and Y directions is defined as a Z direction. In this example, the Z direction is the vertical direction.

As for the Y direction, the transport direction when the medium M passes through the ID unit 10 is a +Y direction (rearward), and its opposite direction is a −Y direction (forward). As for the X direction, when facing the +Y direction, the right-hand direction is a +X direction, and the left-hand direction is a −X direction. As for the Z direction, the upward direction in FIG. 1 is a +Z direction, and the downward direction is a −Z direction. However, these directions do not limit the orientation of the image forming apparatus 1.

<Housing>

Figure 2:
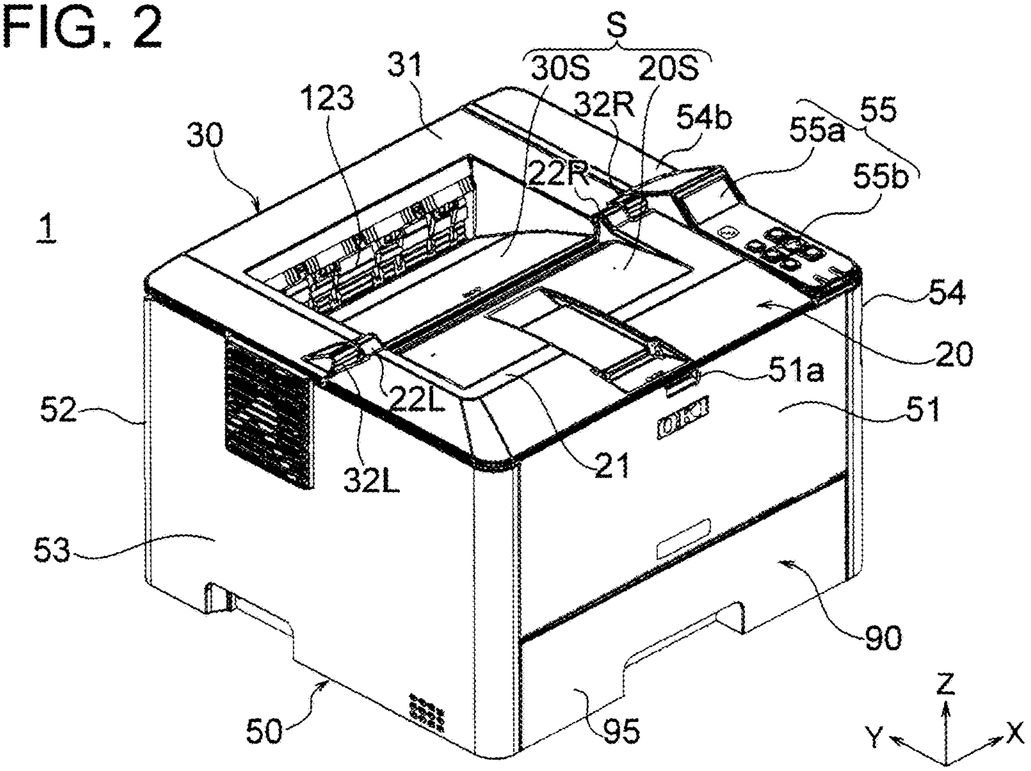
FIG. 2 is a perspective view illustrating an outer appearance of the image forming apparatus of the embodiment.

Next, the housing 50 of the image forming apparatus 1 will be described. FIG. 2 is a perspective view illustrating an outer appearance of the image forming apparatus 1. As illustrated in FIG. 2, the housing 50 of the image forming apparatus 1 has a front cover 51 in the −Y direction (front side), a rear cover 52 in the +Y direction (rear side), a side cover 53 in the −X direction (left side), and a side cover 54 in the +X direction (right side).

An opening 51*a* is formed at an end portion (upper end portion) of the front cover 51 in the +Z direction. The opening 51*a* allows the user to insert its finger for opening the first cover 20. A front panel 95 of the medium cassette 90 is located in the −Z direction (below) of the front cover 51. The front cover 51 is configured to be openable and closable about the rotation axis in the X direction. Detailed description of opening and closing of the front cover 51 is omitted.

<First Cover and Second Cover>

Next, the first cover 20 and the second cover 30 will be described. As described above, the first cover 20 and the second cover 30 are located in the +Z direction (upward) of the housing 50. The first cover 20 is located in the −Y direction (forward), whereas the second cover 30 is located in the +Y direction (rearward).

More specifically, the first cover 20 covers a first area 101 (FIG. 1) located in the −Y direction (forward) in a space inside the housing 50. The second cover 30 covers a second area 102 (FIG. 1) located in the +Y direction (rearward) in the space inside the housing 50.

The first cover 20 and the second cover 30 are coupled to each other by a first coupling part (shafts 23L and 23R and holes 33L and 33R) described later, substantially at the center of the housing 50 in the Y direction.

The first cover 20 has a top plate 21, and a first stacker portion 20S is formed at the center of the top plate 21. The second cover 30 has a top plate 31, and a second stacker portion 30S is formed at the center of the top plate 31.

The first stacker portion 20S and the second stacker portion 30S are portions where the media M ejected from the ejection port 123 are placed, and these stacker portions form a continuous placing surface S. Both the first stacker portion 20S and the second stacker portion 30S are inclined so that their height decreases in the +Y direction (rearward).

An operation panel 55 is provided on the side cover 54. The operation panel 55 has a display section 55*a* that displays information and an operation section 55*b* that accepts user's input. The display section 55*a* is located substantially at the center of the housing 50 in the Y direction and protrudes from a top surface 54*b* of the side cover 54 in the +Z direction (upward).

As illustrated in FIG. 1, the interior of the housing 50 is divided into the first area 101 and the second area 102, as described above. The toner cartridge 17 is disposed within the first area 101, and the fixing unit 80 is disposed within the second area 102. The ID unit 10 and the transfer unit 70 are both disposed across the first area 101 and the second area 102.

<First Coupling Part>

Figure 3A:
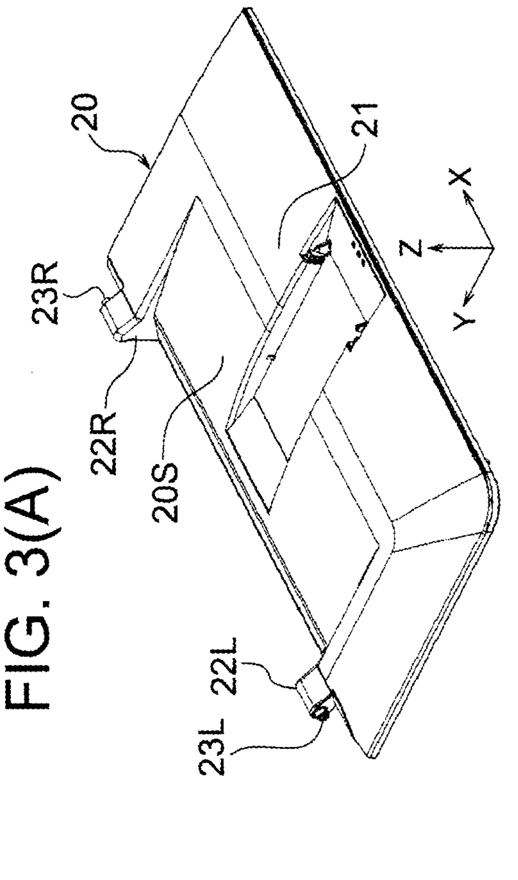
FIGS. 3(A) and 3(B) are top perspective views illustrating a first cover of the embodiment.
Figure 3B:
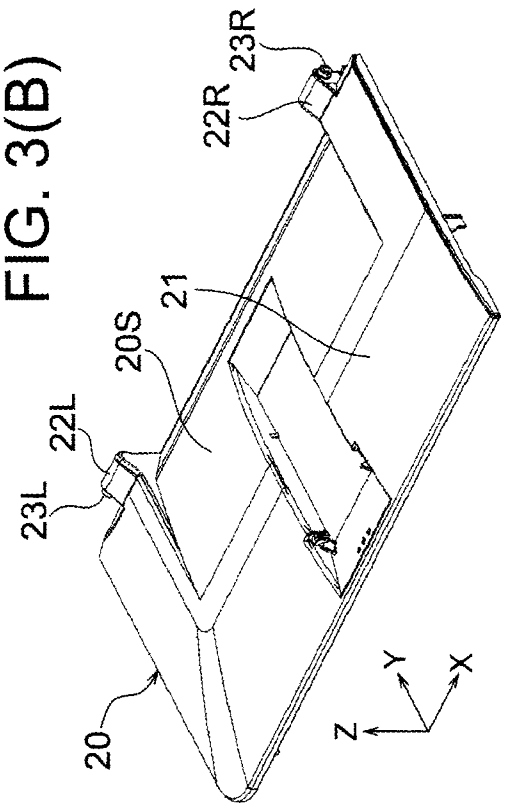
Figure 3C:
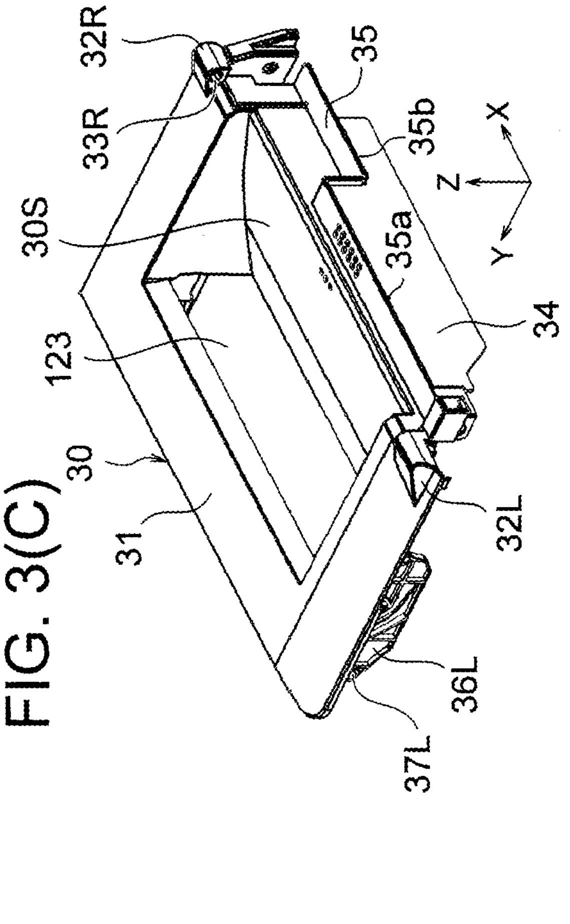
FIGS. 3(C) and 3(D) are top perspective views illustrating a second cover of the embodiment.
Figure 3D:
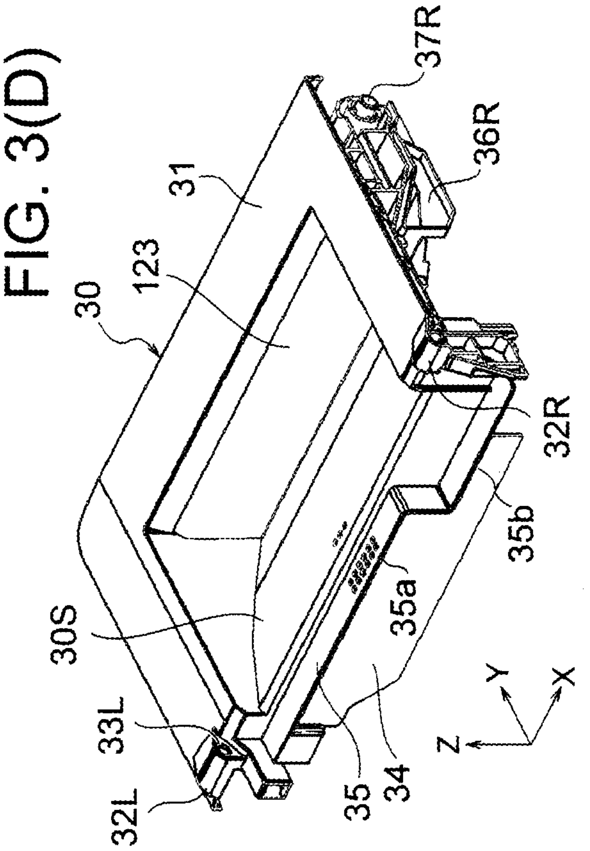

Next, the first coupling part that couples the first cover 20 and the second cover 30 will be described. FIGS. 3(A) and 3(B) are top perspective views of the first cover 20. FIGS. 3(C) and 3(D) are top perspective views of the second cover 30.

As illustrated in FIGS. 3(A) and 3(B), protrusions 22L and 22R protruding in the +Z direction (upward) are formed at the rear end portion (end portion in the +Y direction) of the first cover 20. The protrusions 22L and 22R are disposed on both sides of the first stacker portion 20S in the X direction. The shafts 23L and 23R are formed on outer surfaces of the protrusions 22L and 22R in the X direction, respectively. The shafts 23L and 23R have their axial direction in the X direction and are located coaxially with each other.

As illustrated in FIGS. 3(C) and 3(D), protrusions 32L and 32R are formed at the front end portion (end portion in the −Y direction) of the second cover 30. The protrusions 32L and 32R are disposed on both sides of the second stacker portion 30S in the X direction. The holes 33L and 33R are formed on surfaces that face the protrusions 32L and 32R, respectively. The holes 33L and 33R face each other in the X direction.

The shaft 23L of the first cover 20 engages with the hole 33L of the second cover 30, and the shaft 23R of the first cover 20 engages with the hole 33R of the second cover 30. By the engagement of the shaft 23L with the hole 33L and the engagement of the shaft 23R with the hole 33R, the first cover 20 and the second cover 30 are coupled with each other, and the first cover 20 becomes rotatable about a rotation axis (first rotation axis) in the X direction with respect to the second cover 30.

Thus, the shafts 23L and 23R of the first cover 20 and the holes 33L and 33R of the second cover 30 constitute the first coupling part that couples the first cover 20 and the second cover 30.

<Second Coupling Part>

Figure 4A:
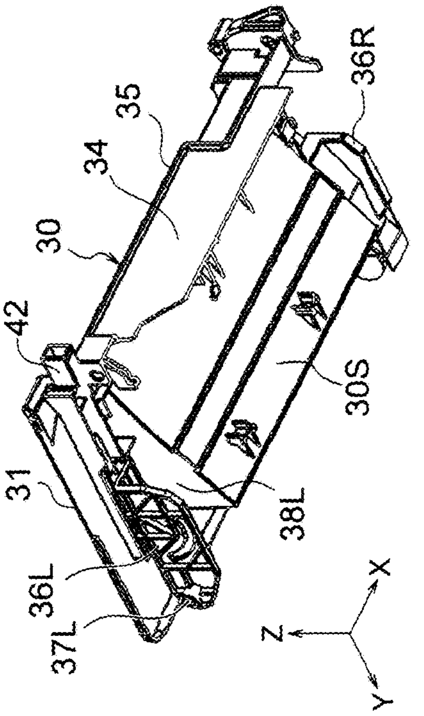
FIGS. 4(A) and 4(B) are bottom perspective views illustrating the second cover of the embodiment.
Figure 4B:
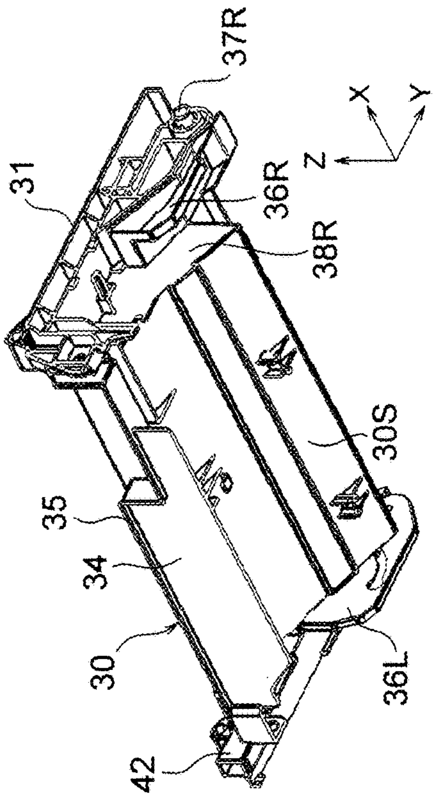
Figure 4C:
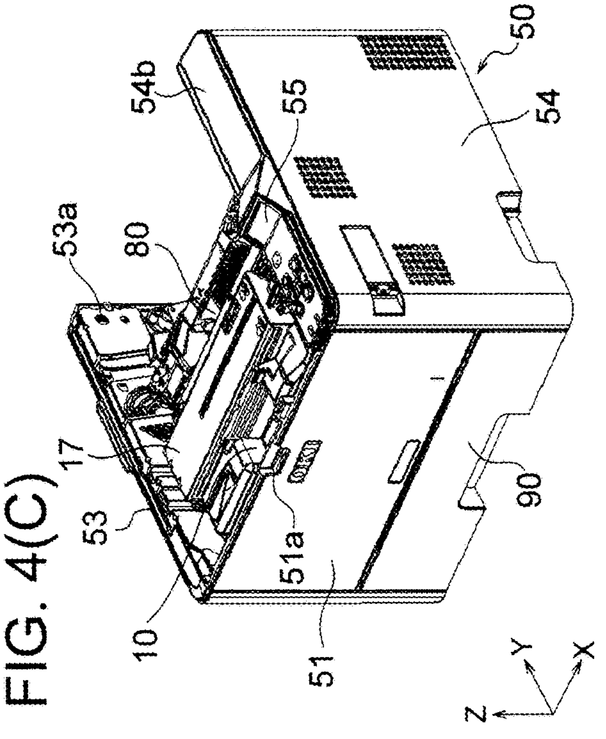
FIGS. 4(C) and 4(D) are top perspective views illustrating a housing of the embodiment.
Figure 4D:
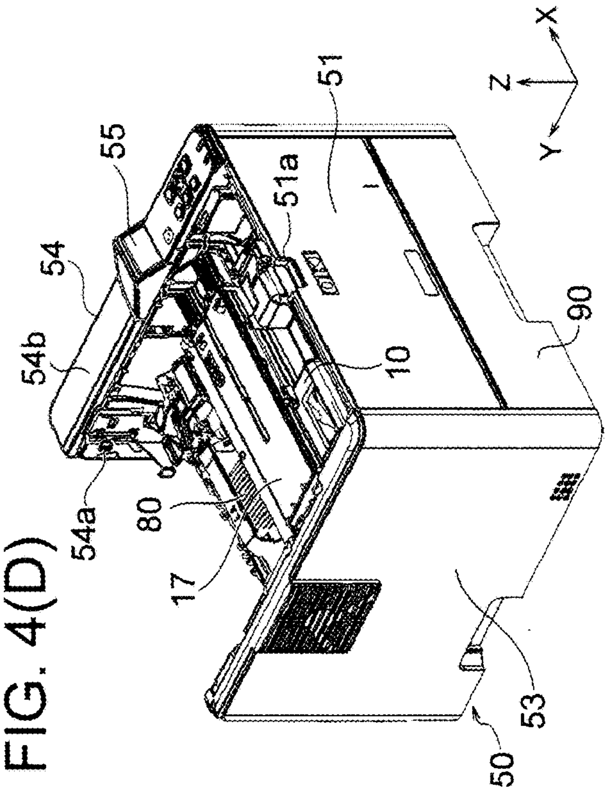

Next, the second coupling part that couples the second cover 30 and the housing 50 will be described. FIGS. 4(A) and 4(B) are bottom perspective views of the second cover 30. FIGS. 4(C) and 4(D) are top perspective views of the housing 50.

As illustrated in FIGS. 4(A) and 4(B), side plates 36L and 36R are provided in the −Z direction (downward) of the top plate 31 of the second cover 30. The side plates 36L and 36R are disposed on both sides of the second stacker portion 30S in the X direction, and extend in the Y direction. Shafts 37L and 37R are formed on the outer surfaces in the X direction at the end portions (rear end portions) of the side plates 36L and 36R in the +Y direction, respectively. The shafts 37L and 37R have their axial direction in the X direction and are located coaxially with each other.

As illustrated in FIGS. 4(C) and 4(D), holes 53*a* and 54*a* are formed on the inner surfaces in the X direction at the rear end portions (end portions in the +Y direction) of the side covers 53 and 54 of the housing 50, respectively. The holes 53*a* and 54*a* face each other in the X direction.

The shaft 37L of the second cover 30 engages with the hole 53*a* of the side cover 53, and the shaft 37R of the second cover 30 engages with the hole 54*a* of the side cover 54. By the engagement of the shaft 37L with the hole 53*a* and the engagement of the shaft 37R with the hole 54*a*, the second cover 30 and the housing 50 are coupled with each other, and the second cover 30 becomes rotatable about a rotation axis in the X direction (second rotation axis) with respect to the housing 50.

Thus, the shafts 37L and 37R of the second cover 30 and the holes 53*a* and 54*a* of the housing 50 constitute the second coupling part that couples the first cover 20 and the second cover 30.

<Wall Portion>

Next, a wall portion 34 provided on the second cover 30 will be described. As illustrated in FIGS. 3(C) and 3(D), the wall portion 34 is provided at an end portion (front end portion) of the second cover 30 in the −Y direction. More specifically, the wall portion 34 extends in the −Z direction (downward) from an end portion (front end portion) in the −Y direction of the second stacker portion 30S.

The wall portion 34 restricts access to the second area 102 (FIG. 1) within the housing 50 in a state where the first cover 20 is opened and the second cover 30 is closed, as described later.

A plate 35 extending in the X direction is provided along the end portion (upper end portion) of the wall portion 34 in the +Z direction. The second cover 30 is pushed upward by springs 64L and 64R (described later) of the head holder 60 in a state where the engagement of locking portions 39L and 39R (described later) is released. At that time, the user hooks its finger onto the plate 35 to open the second cover 30.

As illustrated in FIGS. 3(C) and 3(D), the plate 35 has a first portion 35*a* with a higher height, and a second portion 35*b* with a lower height. The first portion 35*a* extends from the center of the plate 35 in the X direction to the end portion of the plate 35 in the −X direction (left side). The second portion 35*b* is located in the +X direction (right side) with respect to the center of the plate 35 in the X direction. This configuration is to facilitate an operation of the operating lever 17*b* of the toner cartridge 17 or the like as described later and to prevent unintentional detachment of the ID unit 10.

<Opening and Closing of First and Second Covers>

Figures 5A, 5B, 5C:
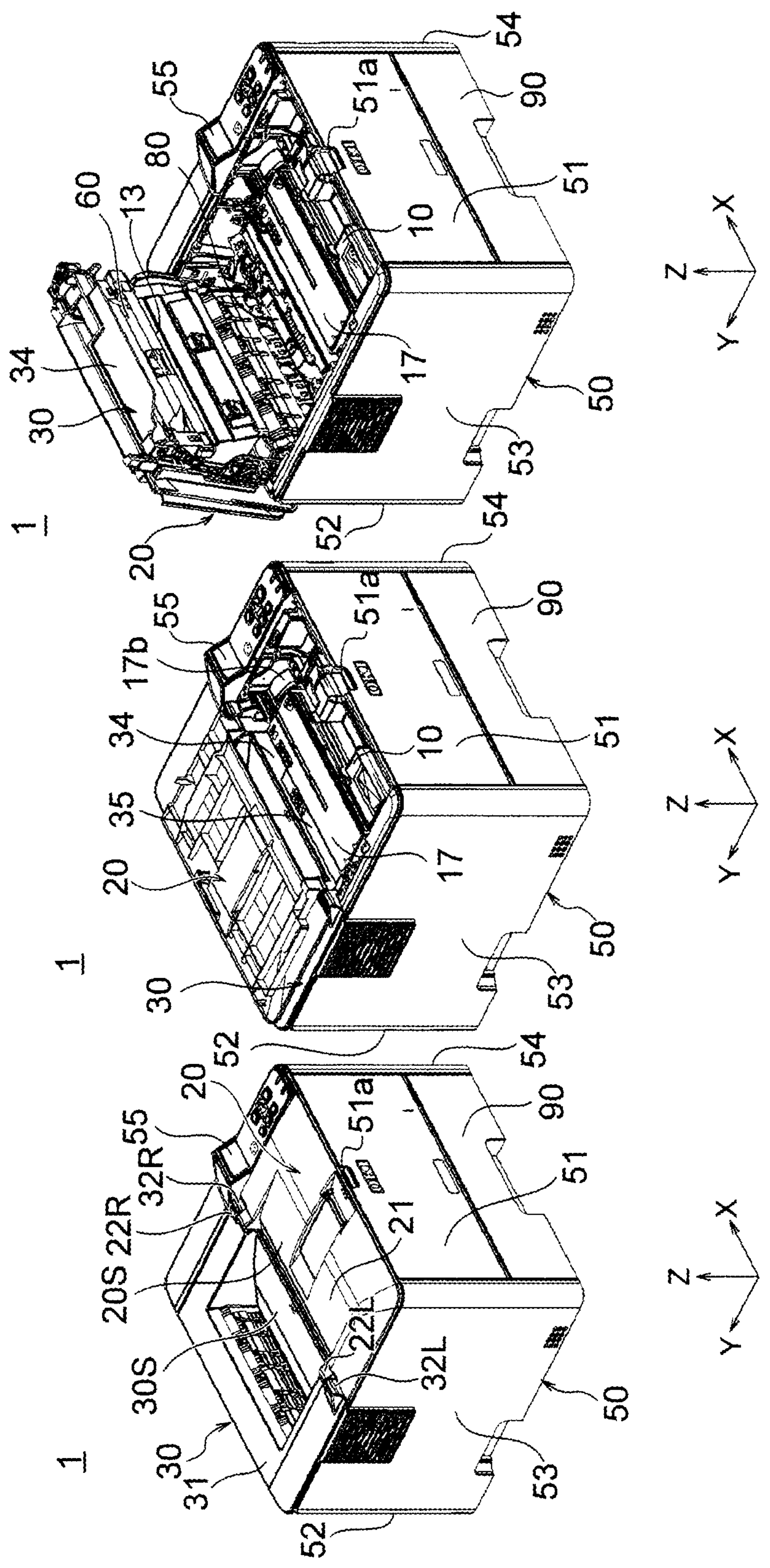
FIG. 5(A) is a perspective view illustrating a state in which the first cover and the second cover of the image forming apparatus of the embodiment are closed.
FIG. 5(B) is a perspective view illustrating a state in which only the first cover is opened.
FIG. 5(C) is a perspective view illustrating a state in which the first cover and the second cover are opened.

Next, opening and closing of the first cover 20 and the second cover 30 will be described. FIG. 5(A) is a perspective view illustrating a state in which the first cover 20 and the second cover 30 of the image forming apparatus 1 are closed. FIG. 5(B) is a perspective view illustrating a state in which only the first cover 20 is opened. FIG. 5(C) is a perspective view illustrating a state in which the first cover 20 and the second cover 30 are opened.

In the state illustrated in FIG. 5(A), the first cover 20 is located at a closing position, and the second cover 30 is also located at a closing position. The first area 101 (FIG. 1) within the housing 50 is covered with the first cover 20, while the second area 102 (FIG. 1) is covered with the second cover 30.

As illustrated in FIG. 5(B), the first cover 20 is supported by the first coupling part (shafts 23L and 23R and holes 33L and 33R) so as to be rotatable by 180 degrees from the closing position illustrated in FIG. 5(A).

Consequently, the first cover 20 is brought into a state in which the first cover 20 overlaps the second cover 30. That is, the top plates 21 and 31 (FIG. 2) of the first cover 20 and the second cover 30 contact each other, and the stacker portions 20S and 30S (FIG. 2) face each other. This position is an opening position of the first cover 20.

When the first cover 20 rotates to the opening position illustrated in FIG. 5(B), an upper portion of the first area 101 (FIG. 1) within the housing 50 is opened. Thus, the toner cartridge 17 becomes accessible. Meanwhile, the wall portion 34 provided in the second cover 30 restricts access to the second area 102.

As illustrated in FIG. 5(C), the second cover 30 is supported by the second coupling part (shafts 37L and 37R and holes 53*a* and 54*a*) so as to be rotatable by a predetermined angle of less than 90 degrees (in this example, 80 degrees) from the closing position illustrated in FIG. 5(A), in a state in which the first cover 20 overlaps the second cover 30. The second cover 30 is held in the opening position illustrated in FIG. 5(C) by an urging force of not-shown torsion springs provided around the shafts 37L and 37R.

When the second cover 30 rotates to the opening position illustrated in FIG. 5(C), an upper portion of the first area 101 and an upper portion of the second area 102 (FIG. 1) within the housing 50 are opened. Thus, the ID unit 10 and the fixing unit 80 become accessible.

An opening/closing angle of the second cover 30 is an amount of change in the angle of the second cover 30 (more specifically, an amount of change in the angle of the top plate 31 of the second cover 30) around the shafts 37L and 37R between the closing position illustrated in FIG. 5(B) and the opening position illustrated in FIG. 5(C).

When the opening/closing angle of the second cover 30 exceeds 90 degrees, the first cover 20 may rotate away from the second cover 30 due to its own weight. In contrast, when the opening/closing angle of the second cover 30 is less than 90 degrees, the first cover 20 is kept overlapping the second cover 30.

<Locking Mechanism of First Cover>

Figure 6:
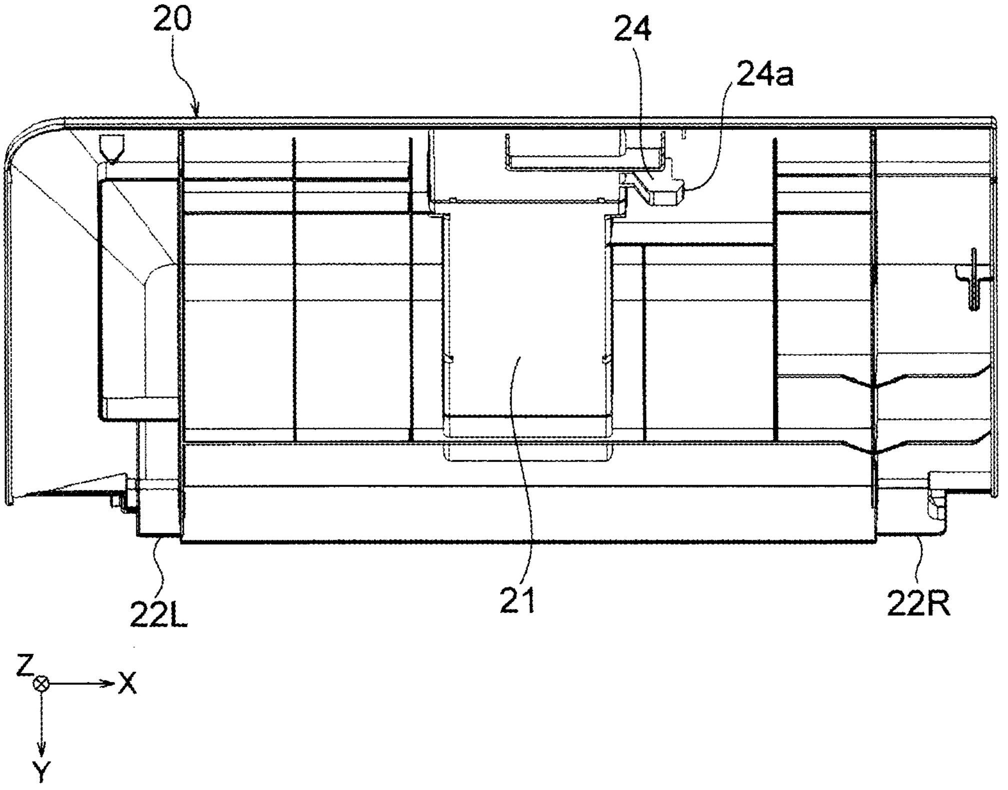
FIG. 6 is a bottom view illustrating the first cover of the embodiment.

Next, a locking mechanism that locks the first cover 20 in the closing position will be described. FIG. 6 is a bottom view illustrating the first cover 20. A locking claw 24 is disposed at the center of the front end portion (end portion in the −Y direction) of the first cover 20. The locking claw 24 has a protruding portion 24*a* that protrudes in the +X direction (rightward).

Figure 7A:
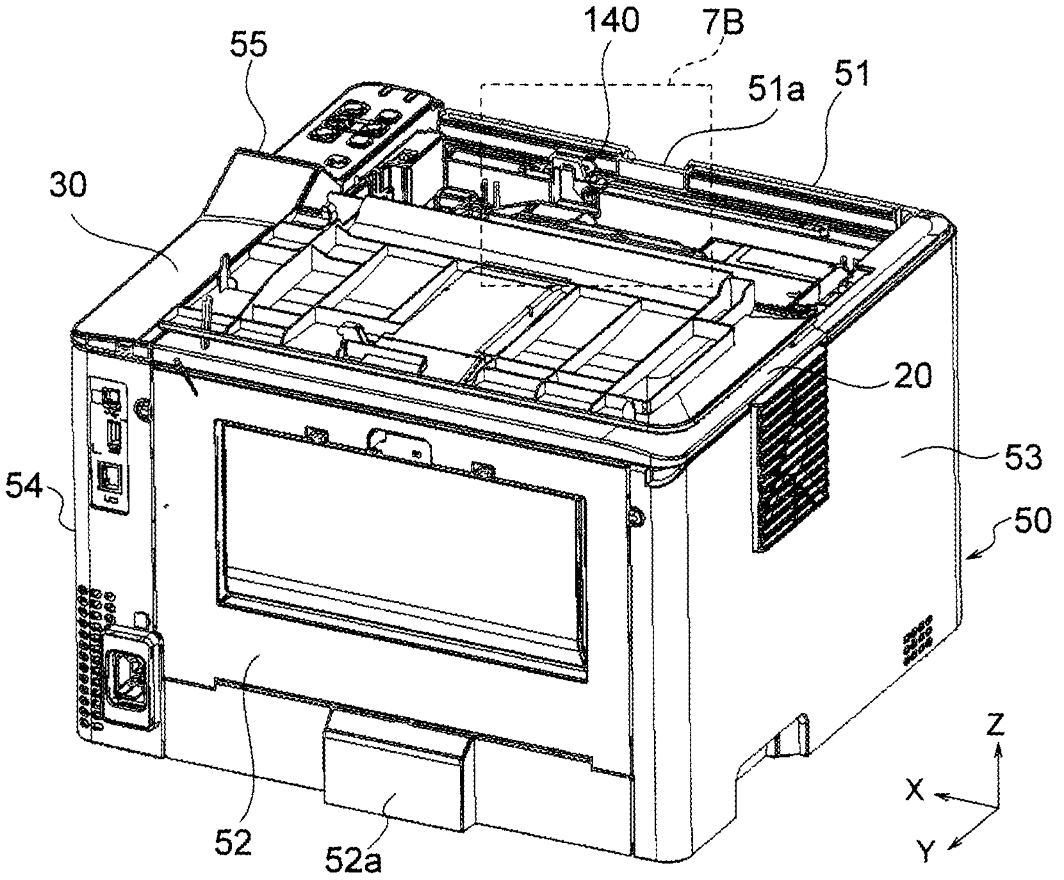
FIG. 7(A) is a perspective view illustrating a state in which the first cover of the image forming apparatus of the embodiment is opened.

FIG. 7(A) is a perspective view illustrating a state in which the first cover 20 of the image forming apparatus 1 is opened. As illustrated in FIG. 7(A), a first lock lever 140 is provided inside the housing 50. The first lock lever 140 is disposed on the rear side (in the +Y direction) of the front cover 51 within the housing 50.

Figure 7B:
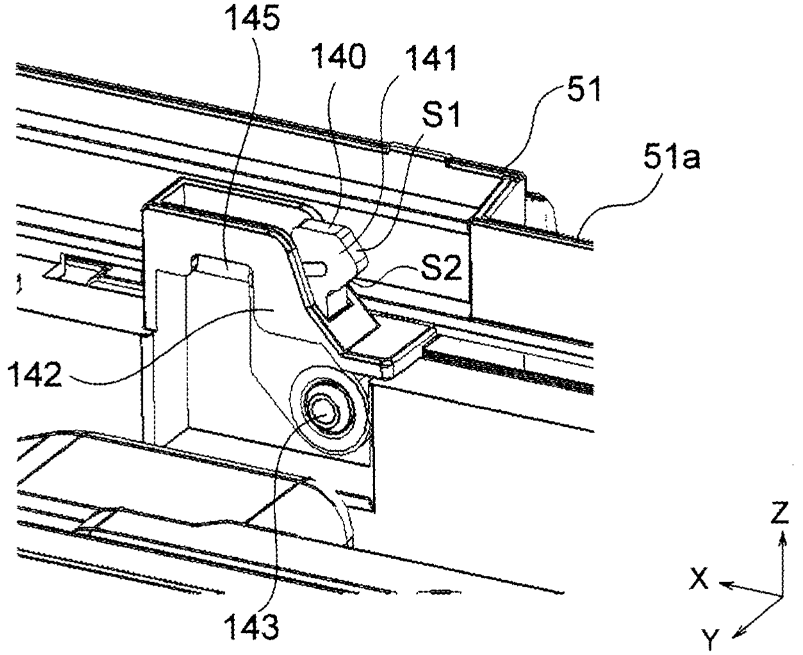
FIG. 7(B) is a perspective view illustrating a first lock lever and its surroundings of the embodiment.

FIG. 7(B) is an enlarged diagram illustrating a portion enclosed by a dashed line 7B in FIG. 7(A). As illustrated in FIG. 7(B), the first lock lever 140 has an engagement portion 141 protruding in the −X direction (leftward). The engagement portion 141 has an inclined surface S1 on the +Z side (upper side) and an inclined surface S2 on the −Z side (lower side).

The first lock lever 140 is supported rotatably about a rotation shaft 143 in the Y direction provided in the housing 50. A lever guide 142 is provided to surround the first lock lever 140. The lever guide 142 restricts the rotation range of the first lock lever 140.

A spring 145 as a first urging member is provided inside the lever guide 142. The spring 145 urges the first lock lever 140 so that the engagement portion 141 protrudes in the −X direction (leftward). By the urging force of the spring 145, the first lock lever 140 is held at a position where the first lock lever 140 protrudes from the lever guide 142 in the −X direction (leftward).

Figure 8A:
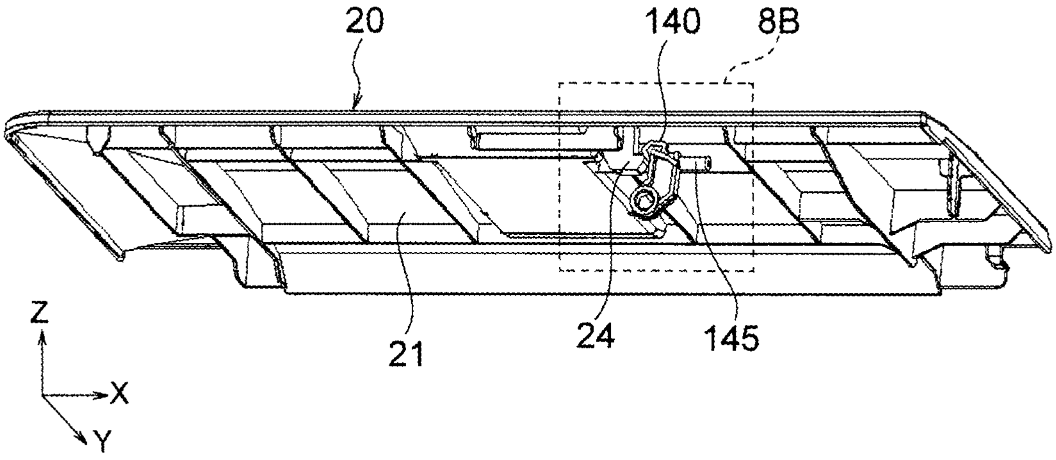
FIG. 8(A) is a perspective view illustrating an engagement state between a locking claw of the first cover and the first lock lever in the embodiment.

FIG. 8(A) is a perspective view illustrating an engagement state between the locking claw 24 of the first cover 20 and the first lock lever 140. Among the members surrounding the first lock lever 140 in FIG. 7(B), only the spring 145 is illustrated in FIG. 8(A).

Figure 8B:
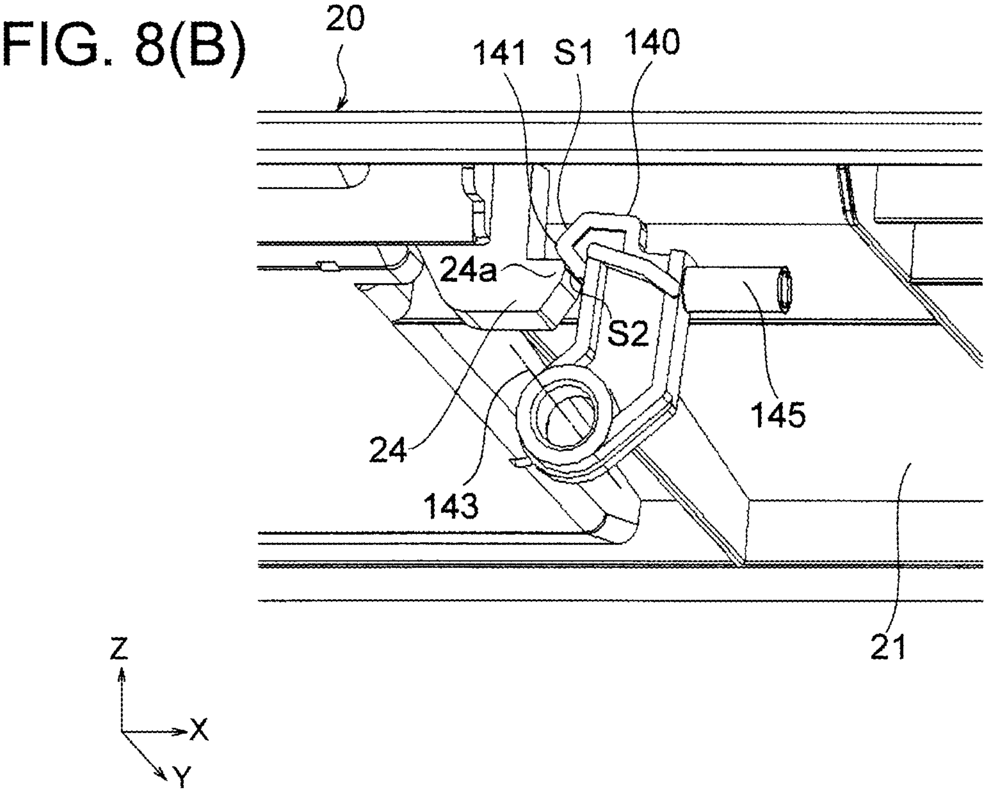
FIG. 8(B) is an enlarged view illustrating a portion where the locking claw and the first lock lever engage with each other.

FIG. 8(B) is an enlarged perspective view illustrating a portion enclosed by a dashed line 8B in FIG. 8(A). As illustrated in FIG. 8(B), by the urging force of the spring 145, the inclined surface S2 of the engagement portion 141 of the first lock lever 140 contacts the protruding portion 24*a* of the locking claw 24, and thus the locking claw 24 is urged in the −Z direction (downward). The first lock lever 140 urges the locking claw 24, and thereby the first cover 20 is locked in the closing position (FIG. 5(A)).

When the first cover 20 is opened, if the force exerted on the first cover 20 by the user exceeds the urging force of the spring 145, the locking claw 24 presses the inclined surface S2 of the first lock lever 140, and thereby the first lock lever 140 moves in the +X direction (rightward). Thus, the lock of the locking claw 24 by the first lock lever 140 is released, allowing the first cover 20 to open.

When the first cover 20 is closed, due to the force exerted on the first cover 20 by the user pushing down the first cover 20, the locking claw 24 of the first cover 20 presses the inclined surface S1 of the first lock lever 140, and thereby the first lock lever 140 moves in the +X direction (rightward). When the locking claw 24 reaches the inclined surface S2 of the first lock lever 140, the first lock lever 140 moves in the −X direction (leftward) due to the urging force of the spring 145, and thereby the locking claw 24 engages with the first lock lever 140. Thus, the first cover 20 is locked in the closing position.

<Locking Mechanism of Second Cover>

Figure 9:
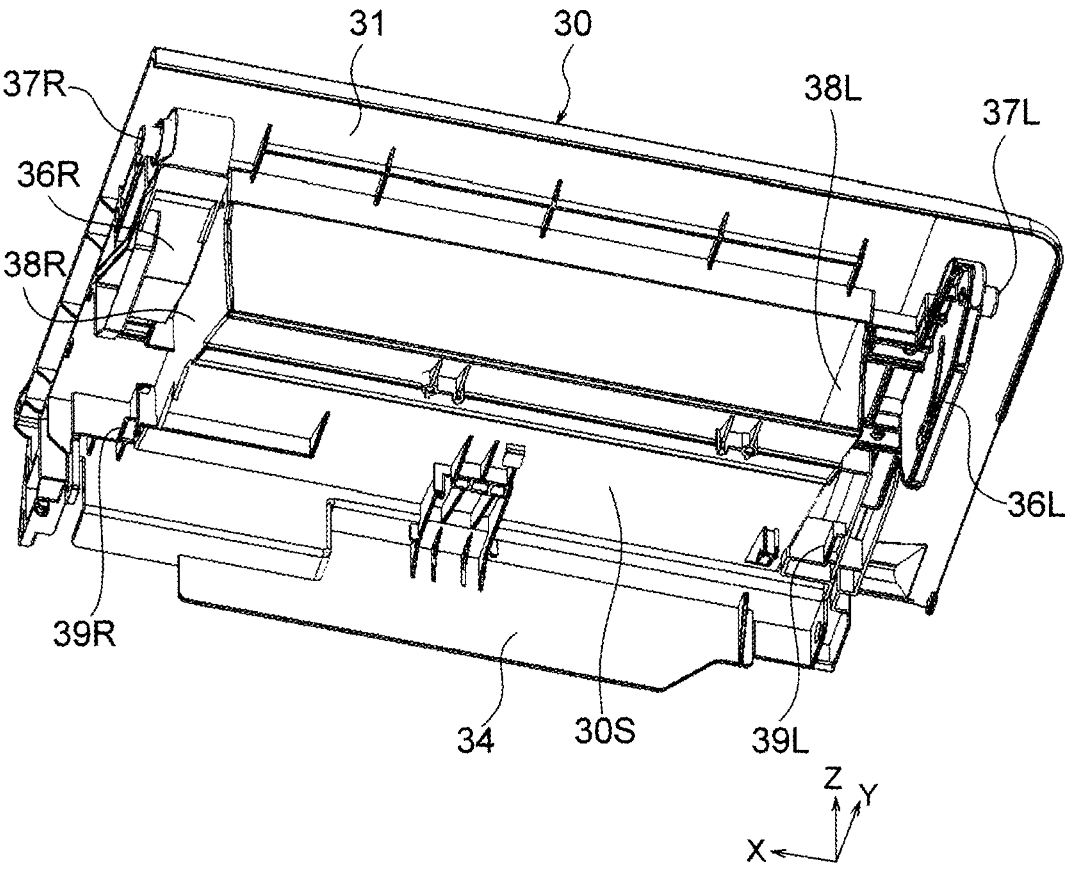
FIG. 9 is a bottom perspective view illustrating the second cover of the embodiment.

Next, a locking mechanism of the second cover 30 will be described. FIG. 9 is a bottom perspective view of the second cover 30. The second cover 30 has side walls 38L and 38R located on both sides of the second stacker portion 30S in the X direction. The locking portions 39L and 39R are formed at front end portions (end portions in the −Y direction) and on the outer sides in the X direction of the side walls 38L and 38R, respectively. The locking portion 39L is also referred to as a first locking portion, and the locking portion 39R is also referred to as a second locking portion.

Figure 10A:
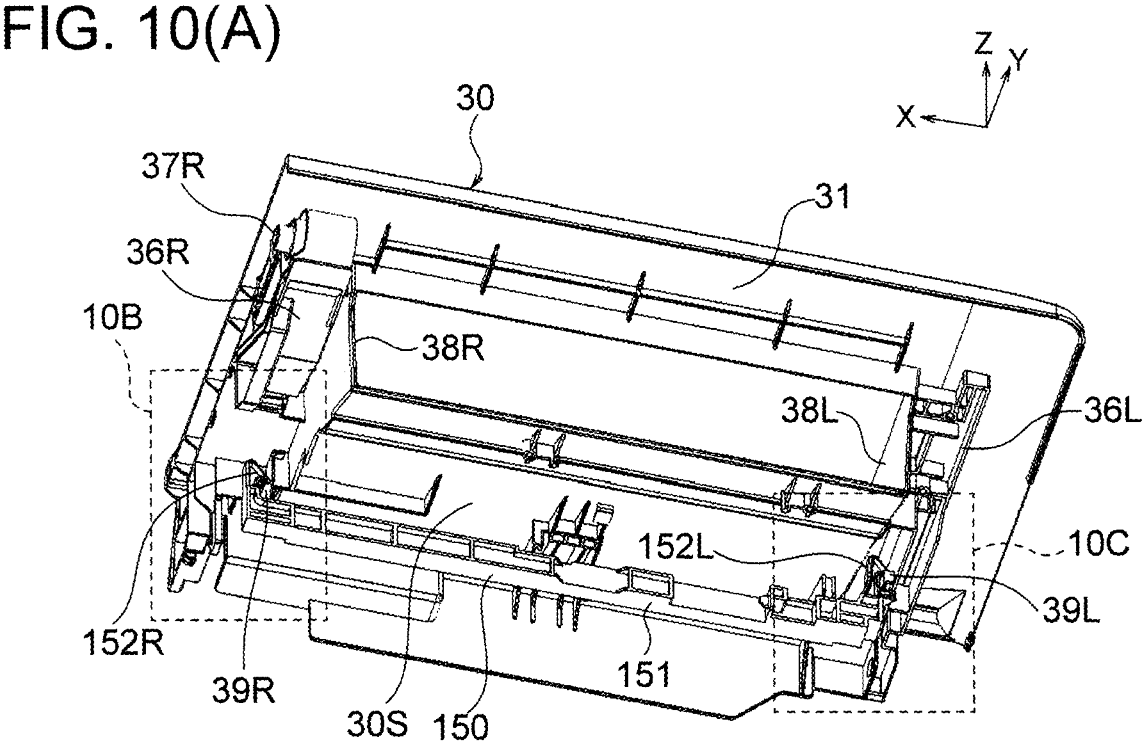
FIG. 10(A) is a perspective view illustrating an engagement state between a locking portion of the second cover and a second lock lever of the embodiment.

FIG. 10(A) is a perspective view illustrating an engagement state between a second lock lever 150 and the locking portions 39L and 39R of the second cover 30. The second lock lever 150 is provided inside the housing 50. The second lock lever 150 is a long member that is elongated in the X direction and is supported so as to be movable in the X direction by a lever holder 56 (FIG. 11(B)) described later.

The second lock lever 150 has an extending portion 151 extending in the X direction, an engagement portion 152L formed at an end portion (left end portion) of the extending portion 151 in the −X direction, and an engagement portion 152R formed at an end portion (right end portion) of the extending portion 151 in the +X direction.

Figure 10B:
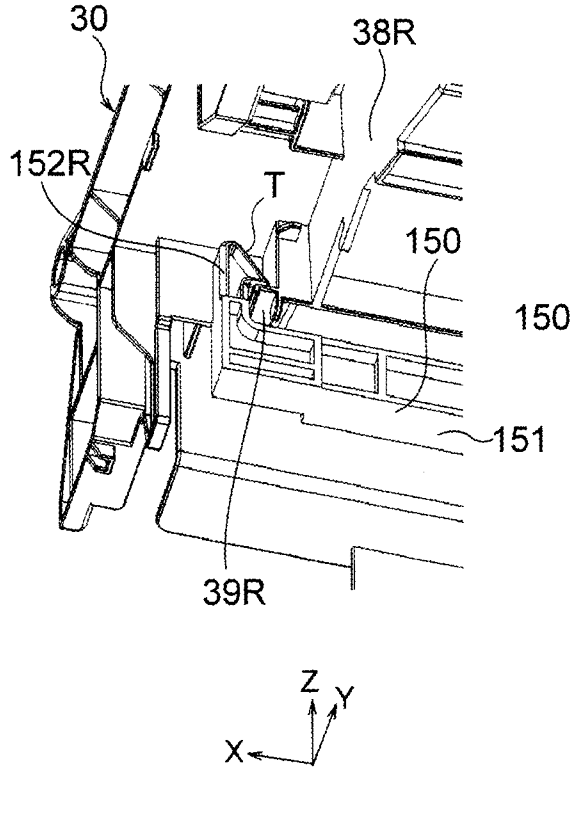
FIGS. 10(B) and 10(C) are enlarged perspective views illustrating a portion where the locking portion and the second lock lever engage with each other.

FIG. 10(B) is an enlarged perspective view of a portion enclosed by a dashed line 10B in FIG. 10(A). As illustrated in FIG. 10(B), the engagement portion 152R of the second lock lever 150 has a hook shape protruding in the −X direction (leftward) and engages with the +Z side (upper side) of the locking portion 39R of the second cover 30.

Figure 10C:
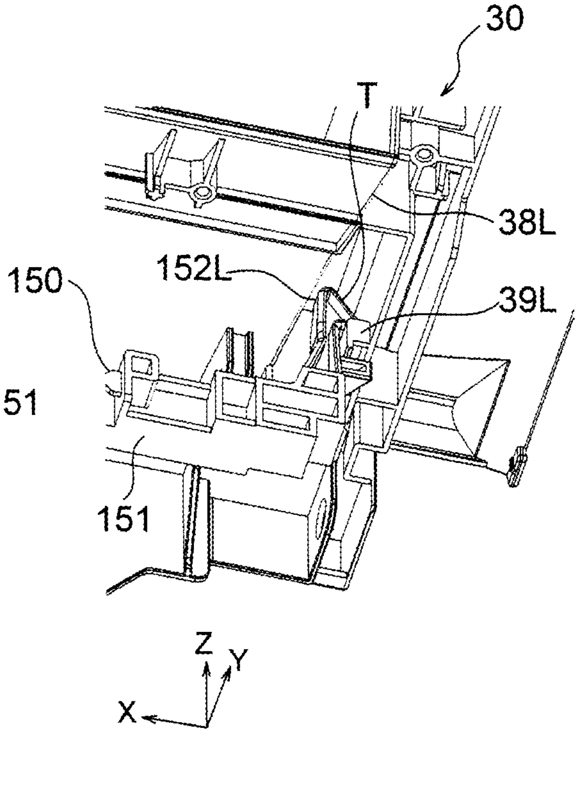

FIG. 10(C) is an enlarged perspective view of a portion enclosed by a dashed line 10C in FIG. 10(A). As illustrated in FIG. 10(C), the engagement portion 152L of the second lock lever 150 has a hook shape protruding in the −X direction (leftward) and engages with the +Z side (upper side) of the locking portion 39L of the second cover 30.

The engagement portions 152L and 152R of the second lock lever 150 engage with the locking portions 39L and 39R of the second cover 30, respectively, and thereby the second cover 30 is locked in the closing position (FIG. 5(A)). The second lock lever 150 and the locking portions 39L and 39R of the second cover 30 constitute a lock part.

When the second lock lever 150 is moved in the +X direction (rightward) by a release lever 40 described later, the engagement portions 152L and 152R move in the +X direction (rightward) away from the locking portions 39L and 39R, respectively, and thereby the lock of the second cover 30 is released.

As illustrated in FIGS. 10(B) and 10(C), each of the engagement portions 152L and 152R has an inclined surface T that is inclined toward the −X side (leftward) with respect to the Z direction (vertical direction). When the second cover 30 is closed, the locking portions 39L and 39R of the second cover 30 contact the respective inclined surfaces T, and thereby the second lock lever 150 moves in the +X direction (rightward).

Furthermore, when the locking portions 39L and 39R of the second cover 30 pass through the inclined surfaces T in the −Z direction (downward), the second lock lever 150 moves in the −X direction (leftward) by the urging force of a spring 155(described later), and thereby the engagement portions 152L and 152R engage with the locking portions 39L and 39R again.

Figure 11A:
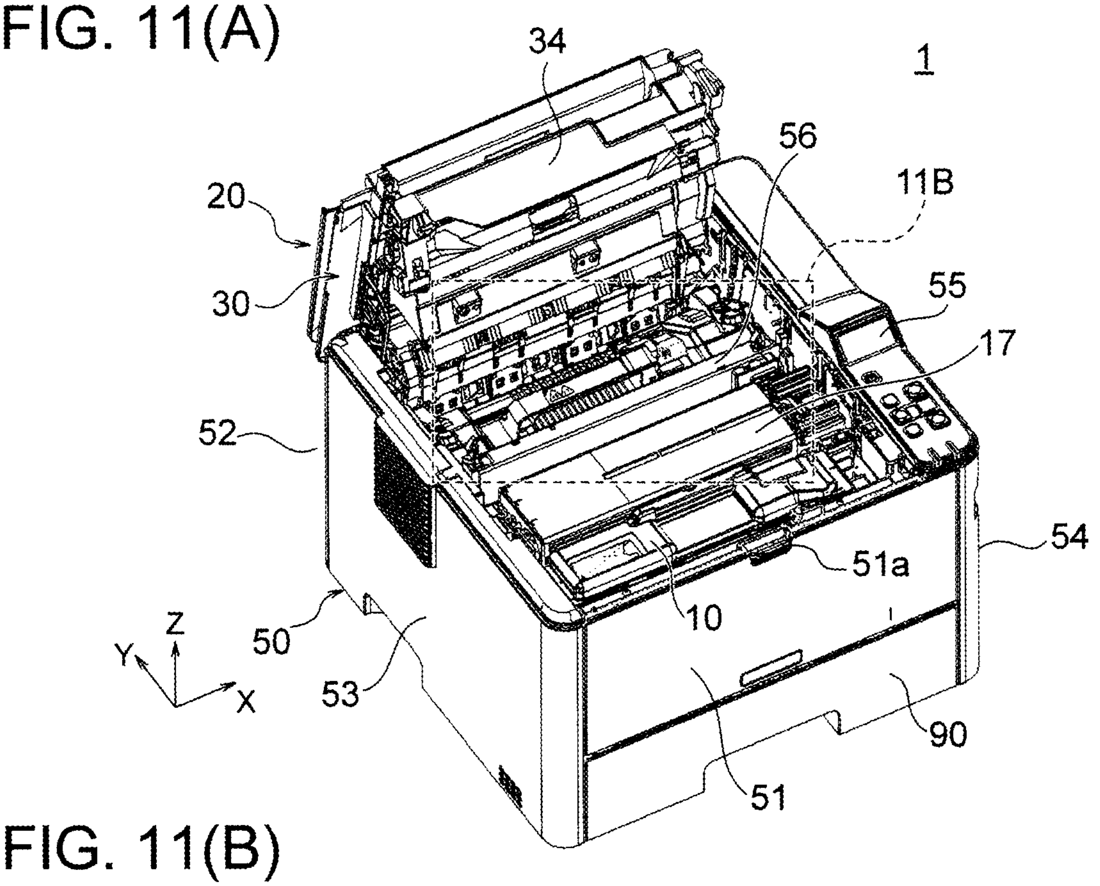
FIG. 11(A) is a perspective view illustrating a state in which the first cover and the second cover of the image forming apparatus of the embodiment are opened.
Figure 11B:
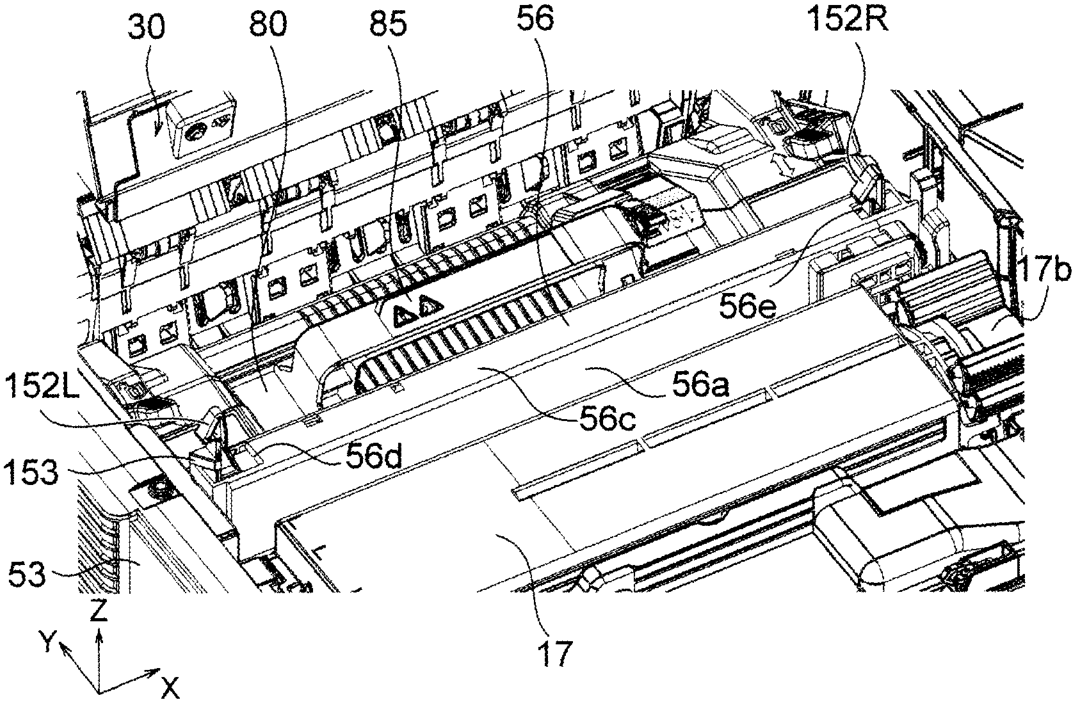
FIG. 11(B) is an enlarged perspective view illustrating a portion of the image forming apparatus.

FIG. 11(A) is a perspective view illustrating a state in which the first cover 20 and the second cover 30 of the image forming apparatus 1 are opened. FIG. 11(B) is an enlarged perspective view of a portion enclosed by a dashed line 11B in FIG. 11(A).

As illustrated in FIG. 11(B), the lever holder 56 that holds the second lock lever 150 is disposed in an area between the ID unit 10 and the fixing unit 80 within the housing 50. In particular, in a state where the second cover 30 is closed, the lever holder 56 is located between the LED head 13(FIG. 1) and the fixing unit 80.

Figure 12A:
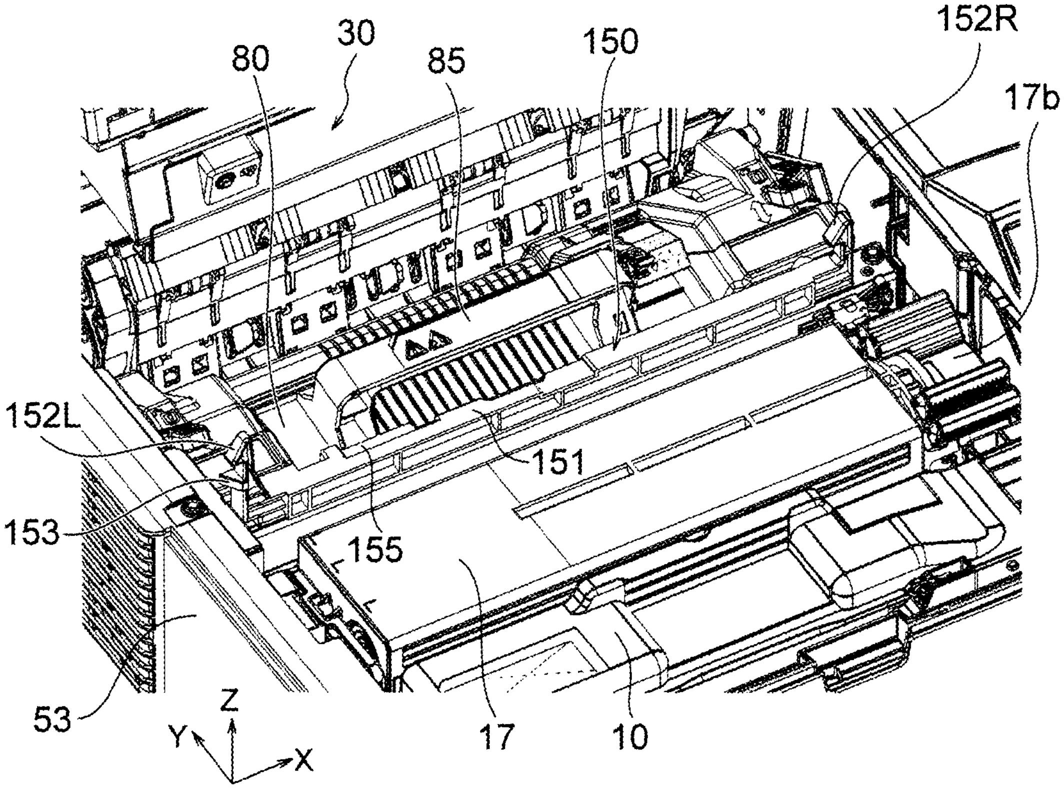
FIG. 12(A) is a perspective view illustrating the portion shown in FIG. 11(B) with a lever holder being removed.
Figure 12B:
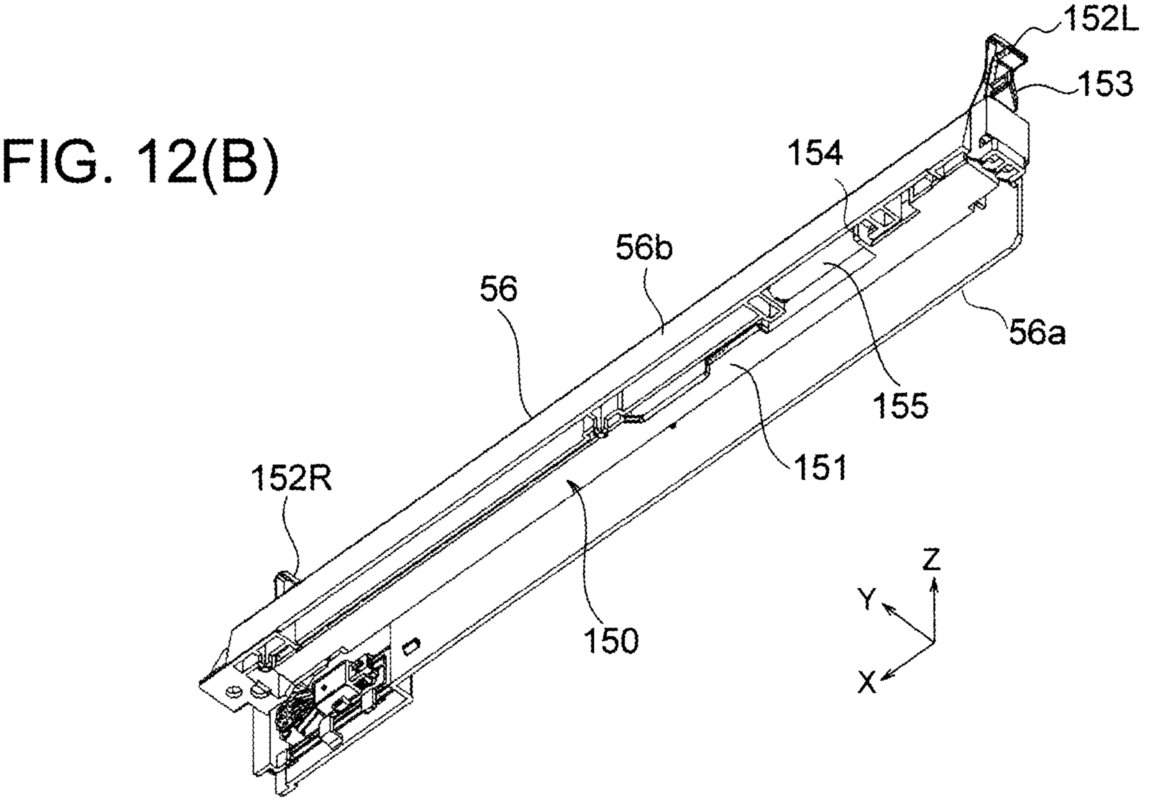
FIG. 12(B) is a perspective view illustrating the second lock lever and the lever holder.

The lever holder 56 has wall portions 56*a* and 56*b* (the wall portion 56*b* is shown in FIG. 12(B)) that face each other in the Y direction and a top plate portion 56*c*. The top plate portion 56*c* has openings 56*d* and 56*e* through which the engagement portions 152L and 152R of the second lock lever 150 protrude in the +Z direction (upward), respectively.

FIG. 12(A) is an enlarged perspective view of the portion shown in FIG. 11(B) with the lever holder 56 being omitted. The second lock lever 150 has a contact portion 153 adjacent to the engagement portion 152L in the −X direction (leftward). The surface of the contact portion 153, which faces in the −X direction (leftward), is an inclined surface that is inclined relative to the Y direction.

FIG. 12(B) is a bottom perspective view of the second lock lever 150 and the lever holder 56 supporting the second lock lever 150. The second lock lever 150 is sandwiched between the wall portions 56*a* and 56*b* of the lever holder 56 from both sides in the Y direction, and is held so as to be movable in the X direction.

The spring 155 as a second urging member is held inside the lever holder 56. The spring 155 contacts an abutment portion 154 of the second lock lever 150 and thereby urges the second lock lever 150 in the −X direction (leftward).

The second lock lever 150 moves in the −X direction (leftward) due to the urging force of the spring 155, and thereby the engagement portions 152L and 152R of the second lock lever 150 engages with the locking portions 39L and 39R of the second cover 30 (FIGS. 10(B) and 10(C)). Thus, the second cover 30 is locked in the closing position. The release of the lock of the second cover 30 is performed by the release lever 40 described below.

<Release Lever>

Figure 13A:
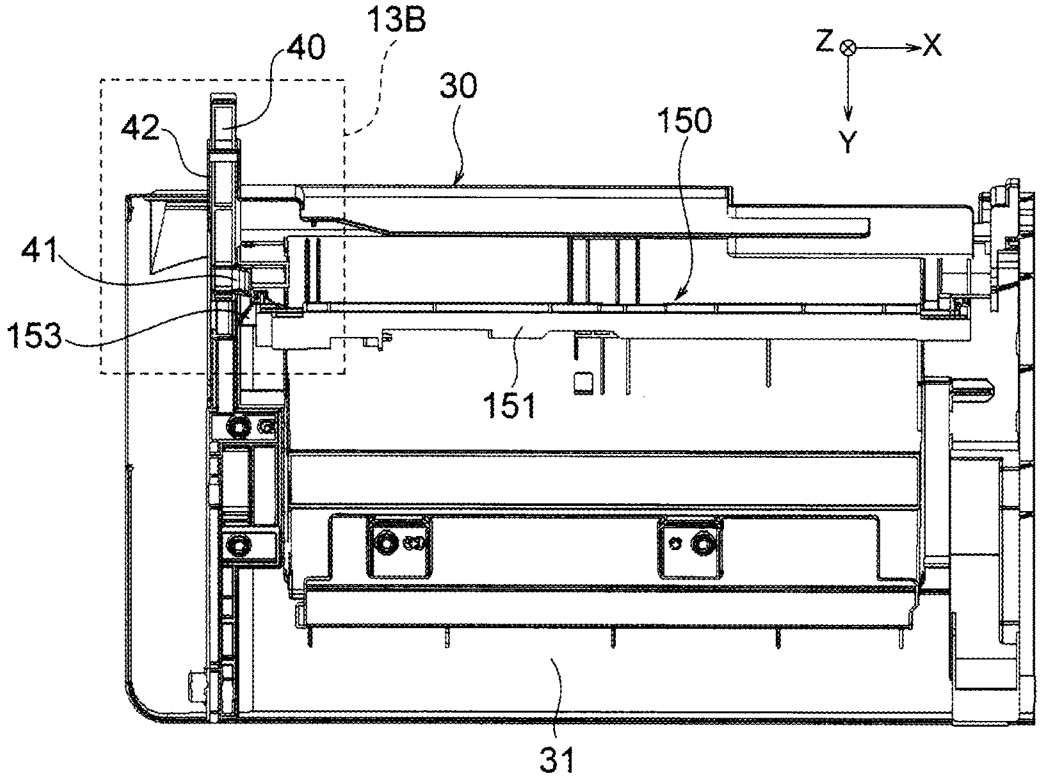
FIG. 13(A) is a bottom view illustrating the second cover of the embodiment.

Next, the release lever 40 that releases the lock of the second cover 30 will be described. FIG. 13(A) is a bottom view illustrating the second cover 30. As illustrated in FIG. 13(A), the release lever 40 is provided in the vicinity of the end portion (left end portion) of the second cover 30 in the −X direction. The release lever 40 is elongated in the Y direction and is held by a lever guide 42 so as to be movable in the Y direction. The release lever 40 protrudes from the second cover 30 in the −Y direction (forward).

Figure 13B:
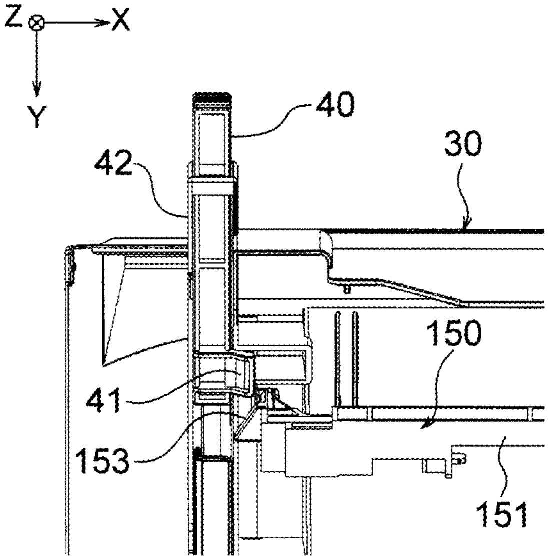
FIGS. 13(B) and 13(C) are enlarged bottom views illustrating a release lever and its surroundings of the embodiment.

FIG. 13(B) is an enlarged bottom view of a portion enclosed by a dashed line 13B in FIG. 13(A). As illustrated in FIG. 13(B), the release lever 40 has a pressing portion 41 that contacts and presses the contact portion 153 of the second lock lever 150. In a state illustrated in FIG. 13(B), the pressing portion 41 is located at a position away from the contact portion 153 in the −Y direction (forward).

Figure 13C:
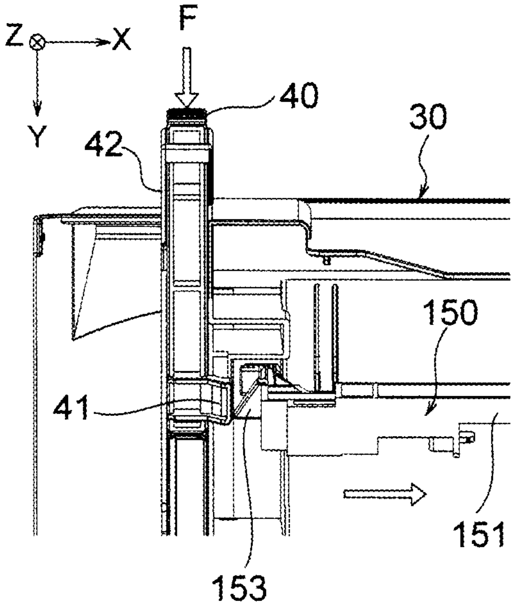

FIG. 13(C) is a bottom view illustrating a state in which the release lever 40 is pushed in from the state of FIG. 13(B) in the +Y direction (rearward). As illustrated in FIG. 13(C), when the release lever 40 is pushed in as indicated by an arrow F, the pressing portion 41 of the release lever 40 contacts and presses the contact portion 153 of the second lock lever 150.

The surface of the contact portion 153 that contacts the pressing portion 41 is inclined with respect to the Y direction. Therefore, when the contact portion 153 is pressed by the pressing portion 41 in the +Y direction, the second lock lever 150 moves in the +X direction (rightward).

When the second lock lever 150 moves in the +X direction (rightward), the engagement portions 152L and 152R of the second lock lever 150 move away from the locking portions 39L and 39R of the second cover 30 (FIGS. 10(B) and 10(C)), respectively.

Figure 14A:
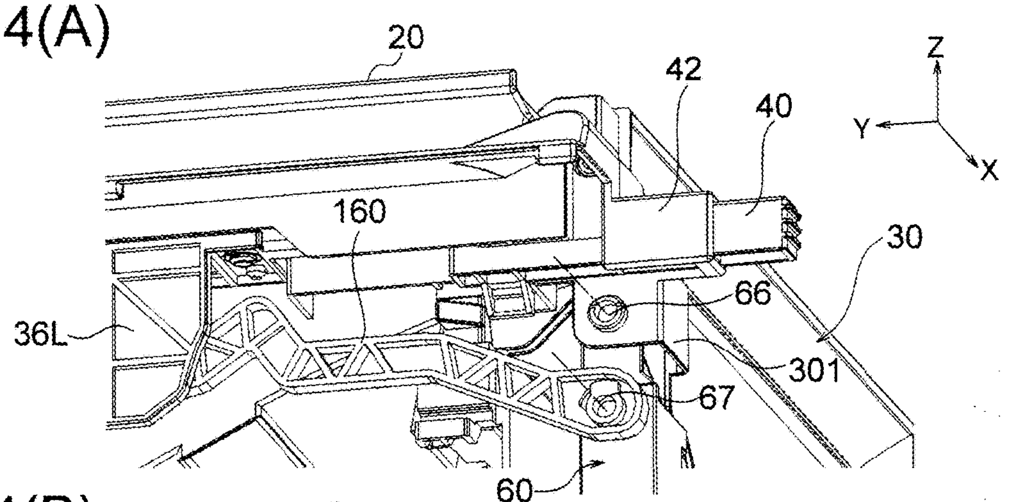
FIGS. 14(A) and 14(B) are perspective views illustrating the release lever and its surroundings in the second cover of the embodiment.

FIG. 14(A) is a perspective view illustrating the release lever 40 and its surroundings in the second cover 30. As illustrated in FIG. 14(A), the release lever 40 is supported by the lever guide 42 so as to be movable in the Y direction and protrudes from the second cover 30 in the −Y direction (forward).

Figure 14B:
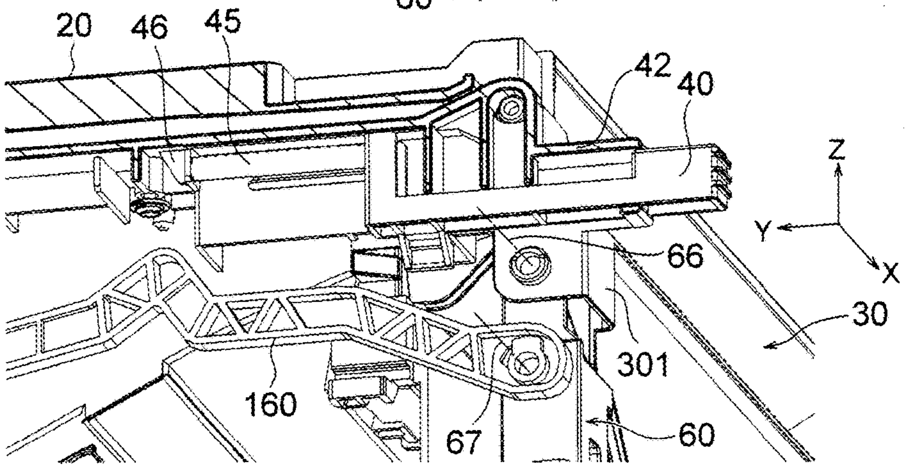
Figure 14C:
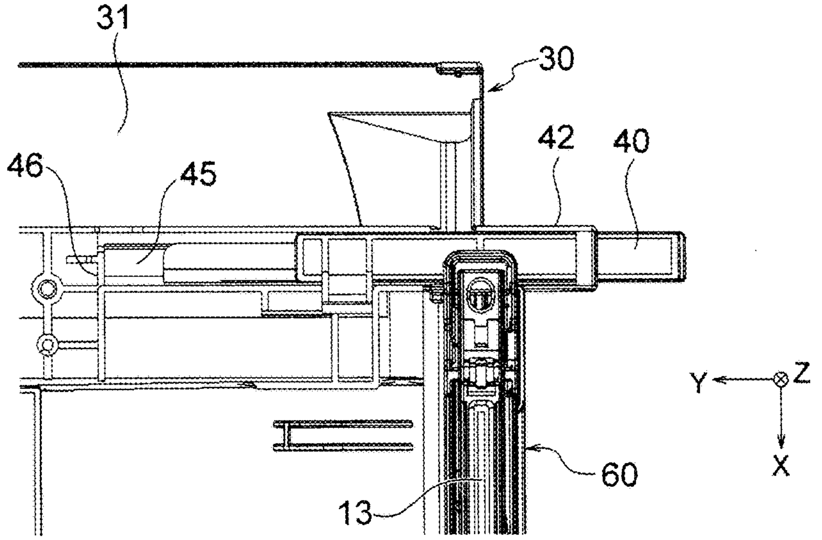
FIG. 14(C) is a bottom view thereof.

FIG. 14(B) is a partial cross-sectional perspective view illustrating the release lever 40 and its surroundings in the second cover 30. FIG. 14(C) is a bottom view illustrating the release lever 40 and its surroundings in the second cover 30.

As illustrated in FIGS. 14(B) and 14(C), a spring 45 as a lock release urging member is disposed inside the lever guide 42 and is located in the +Y direction (rearward) of the release lever 40. The spring 45 urges the release lever 40 in the −Y direction (forward).

The spring 45 is disposed between an abutment portion 46 provided in the lever guide 42 and the end portion (rear end portion) of the spring 45 in the +Y direction, and urges the release lever 40 in the −Y direction (forward). The release lever 40 protrudes from the second cover 30 in the −Y direction (forward) due to the urging force of the spring 45.

When the user pushes the release lever 40 in the +Y direction (rearward), the release lever 40 moves in the +Y direction resisting the urging force of the spring 45, and the pressing portion 41 of the release lever 40 illustrated in FIGS. 13(B) and 13(C) contacts and presses the contact portion 153 of the second lock lever 150.

Thus, the second lock lever 150 moves in the +X direction (rightward), causing the engagement portions 152L and 152R of the second lock lever 150 to separate from the locking portions 39L and 39R of the second cover 30 (FIGS. 10(B) and 10(C)) in the +X direction, respectively. Consequently, the lock of the second cover 30 by the second lock lever 150 is released.

Since the first cover 20 is located in the −Y direction (forward) of the second cover 30, the release lever 40 can be operated by the user only in a state where the first cover 20 is rotated with respect to the second cover 30 (FIG. 5(B)). The operation of the release lever 40 is performed from the −Y side (front side) of the second cover 30, i.e., from the toner cartridge 17 side.

<Head Holder>

Figure 15A:
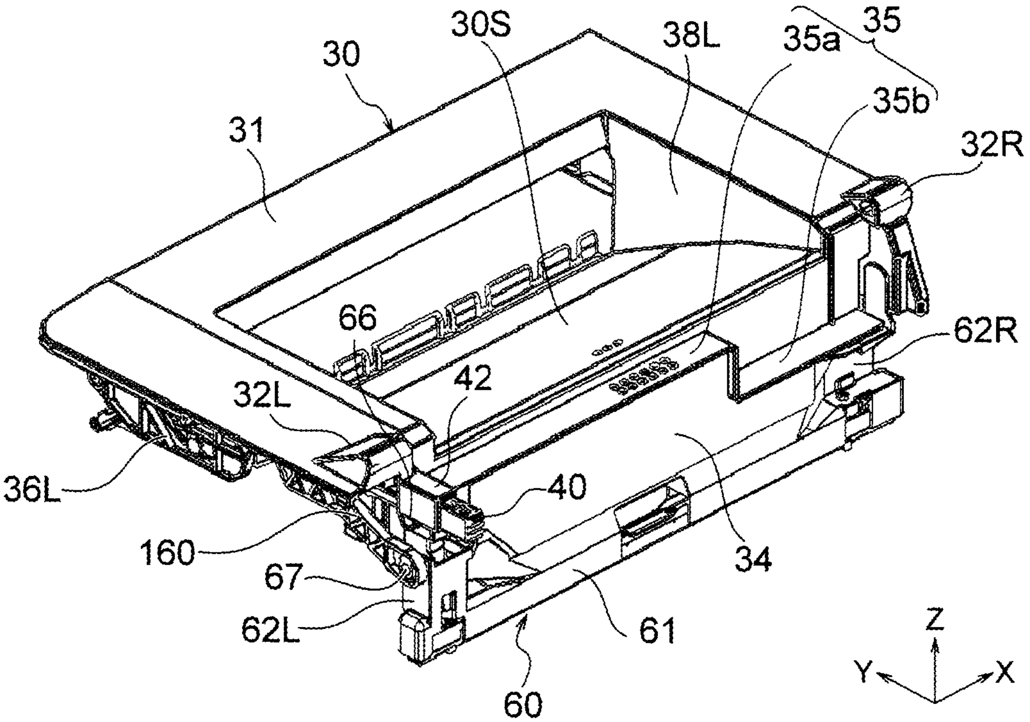
FIG. 15(A) is a top perspective view illustrating the second cover and a head holder of the embodiment.
Figure 15B:
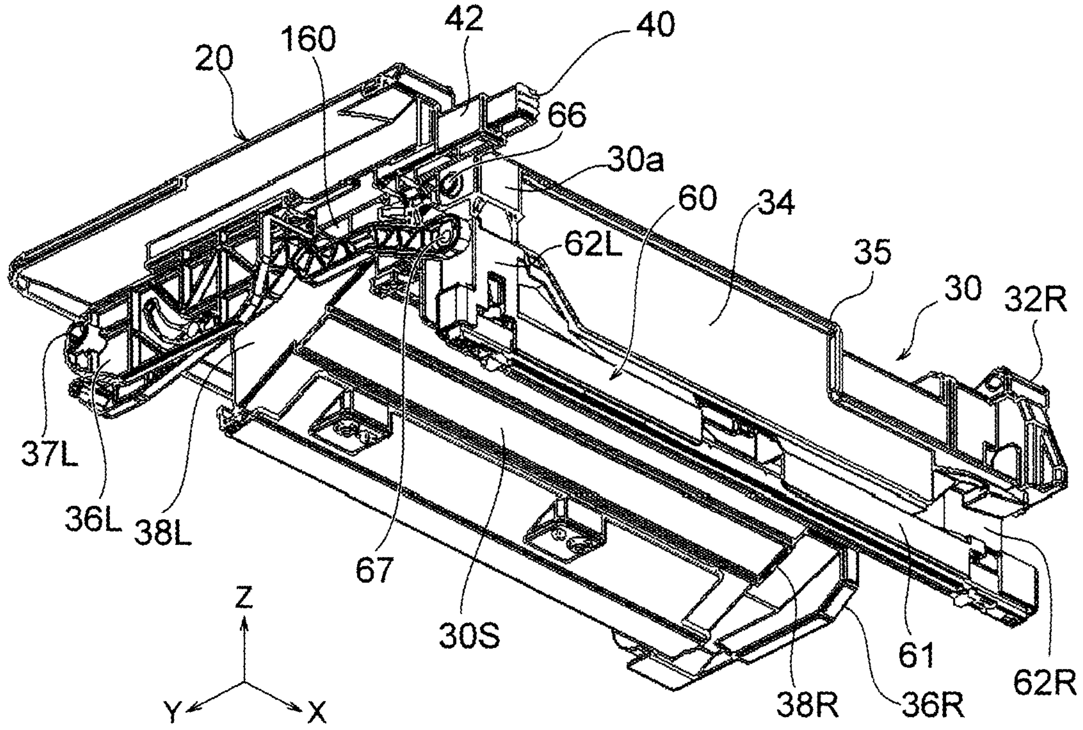
FIG. 15(B) is a bottom perspective view thereof.

Next, the head holder 60 that holds the LED head 13 will be described. FIG. 15(A) is a top perspective view of the second cover 30 and the head holder 60. FIG. 15(B) is a bottom perspective view of the second cover 30 and the head holder 60. The head holder 60 holds the LED head 13 and is coupled to the end portion (front end portion) of the second cover 30 in the −Y direction.

The head holder 60 has a head support portion 61 extending in the X direction, an arm 62L extending in the +Z direction (upward) from an end portion (left end portion) of the head support portion 61 in the −X direction, and an arm 62R extending in the +Z direction from an end portion (right end portion) of the head support portion 61 in the +X direction. The head support portion 61 supports the LED head 13.

The head support portion 61 and the arms 62L and 62R of the head holder 60 form a U-shape and enclose the above-described wall portion 34 from both sides in the X direction (both left and right sides) and the −Z side (bottom side).

A rotation shaft 66 in the X-direction is provided at an end portion (upper end portion) of each of the arms 62L and 62R in the +Z direction. Each rotation shaft 66 of the arms 62L and 62R is supported by a connecting portion 30*a* provided at the end portion (front end portion) of the second cover 30 in the −Y-direction.

Thus, the arms 62L and 62R are coupled to the second cover 30 at their end portions (upper end portions) in the +Z direction. That is, the head holder 60 is supported rotatably about the rotation shaft 66 with respect to the second cover 30.

Figures 16A, 16B, 16C:
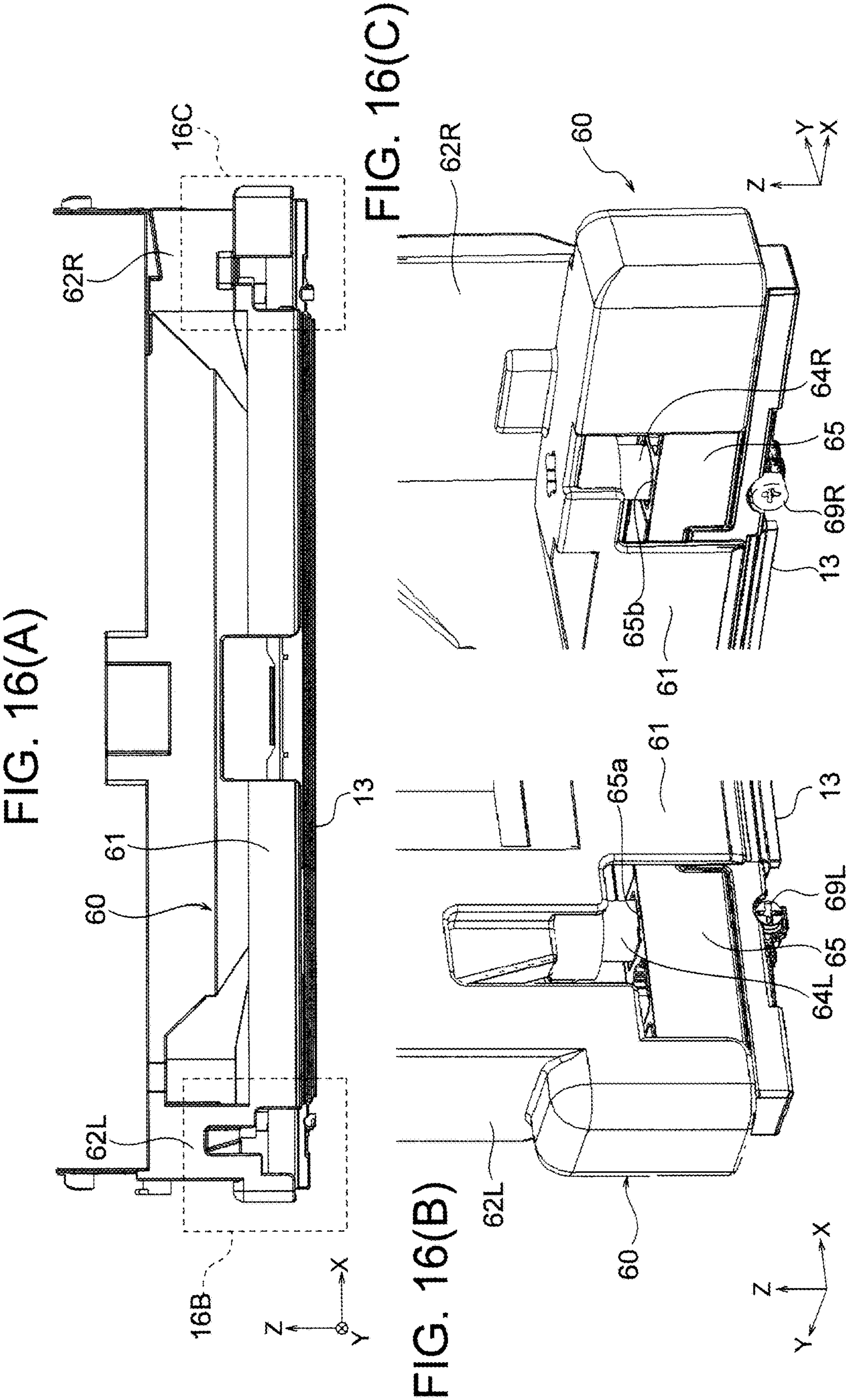
FIG. 16(A) is a front view illustrating the head holder of the embodiment.
FIGS. 16(B) and 16(C) are perspective views illustrating end portions of the head holder.

FIG. 16(A) is a front view illustrating the head holder 60. FIG. 16(B) is an enlarged perspective view illustrating a portion enclosed by a dashed line 16B in FIG. 16(A). FIG. 16(C) is an enlarged perspective view of a portion enclosed by a dashed line 16C in FIG. 16(A).

As illustrated in FIGS. 16(B) and 16(C), a base 65 (to which the LED head 13 is mounted) elongated in the X direction is housed inside the head support portion 61 of the head holder 60. The LED head 13 is mounted on a surface (bottom surface) of the base 65 in the −Z direction.

Figure 17A:
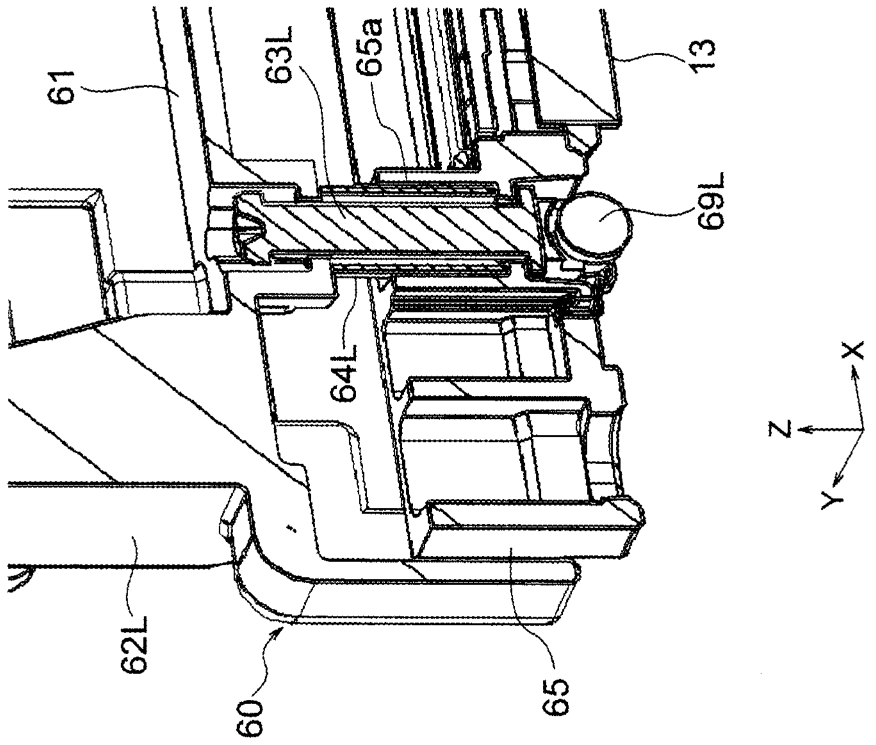
FIGS. 17(A) and 17(B) are partial cross-sectional perspective views illustrating the end portions of the head holder of the embodiment.
Figure 17B:
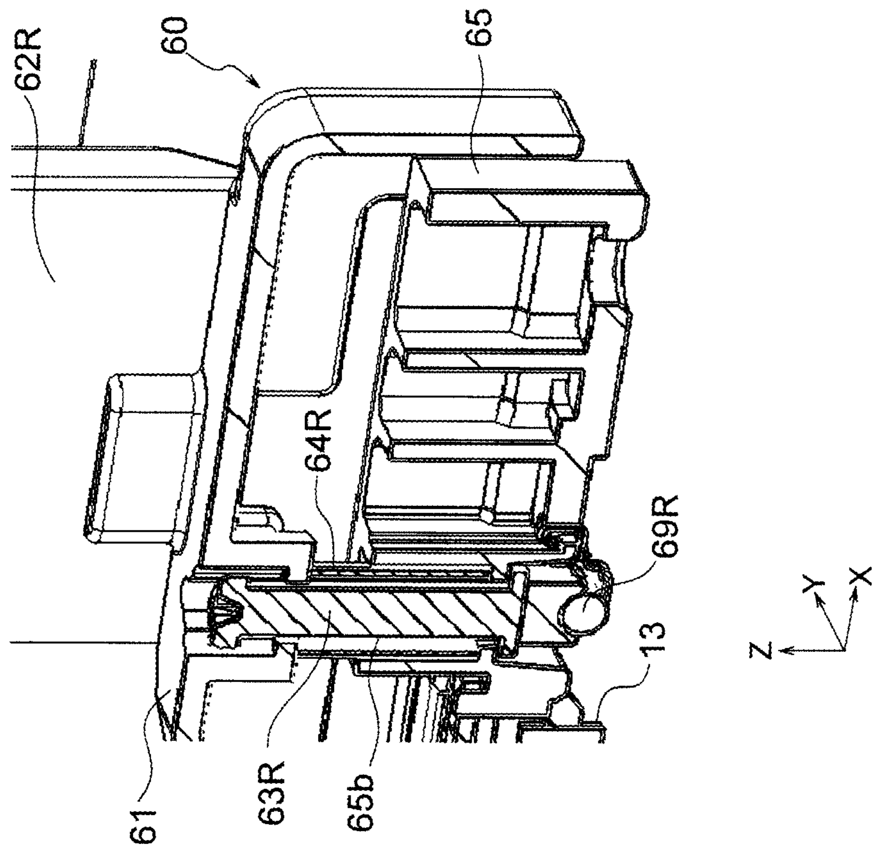

FIGS. 17(A) and 17(B) are partial cross-sectional perspective views illustrating the same areas of the head holder 60 as in FIGS. 16(B) and 16(C), respectively. As illustrated in FIGS. 17(A) and 17(B), the base 65 is coupled to the head support portion 61 via coupling members 63L and 63R. The coupling members 63L and 63R are shaft members whose axial directions are directed to the Z direction.

A hole 65*a* is formed in the vicinity of an end portion (left end portion) of the base 65 in the −X direction. The coupling member 63L is inserted through the hole 65*a*. Similarly, a hole 65*b* is formed in the vicinity of an end portion (right end portion) of the base 65 in the +X direction. The coupling member 63R is inserted through the hole 65*b*.

A spring 64L as a pressing member is disposed around the coupling member 63L inserted in the hole 65*a* of the base 65. The spring 64L is compressed between the head support portion 61 and the base 65 to press the base 65 in the −Z direction (downward).

Similarly, a spring 64R as a pressing member is disposed around the coupling member 63R inserted in the hole 65*b* of the base 65. The spring 64R is compressed between the head support portion 61 and the base 65 to press the base 65 in the −Z direction (downward).

An adjustment portion 69L for adjusting a distance between the head holder 60 and the photosensitive drum 11(FIG. 1) is provided in the −Z direction (below) of the coupling member 63L. Similarly, an adjustment portion 69R for adjusting a distance between the head holder 60 and the photosensitive drum 11(FIG. 1) is provided in the −Z direction (below) of the coupling member 63R.

The adjustment portions 69L and 69R contact not-shown spacers on the surface of the photosensitive drum 11 (but outside an area where an electrostatic latent image is formed, in the X direction) due to the urging force of the springs 64L and 64R, respectively. Thus, the distance between the LED head 13 and the surface of the photosensitive drum 11 is controlled.

In addition, the urging force of the springs 64L and 64R is received by the second cover 30 via the head support portion 61 and the arms 62L and 62R. That is, when the second cover 30 is opened, the urging force of the springs 64L and 64R acts on the second cover 30 in the direction of pushing the second cover 30 upward.

Figure 18A:
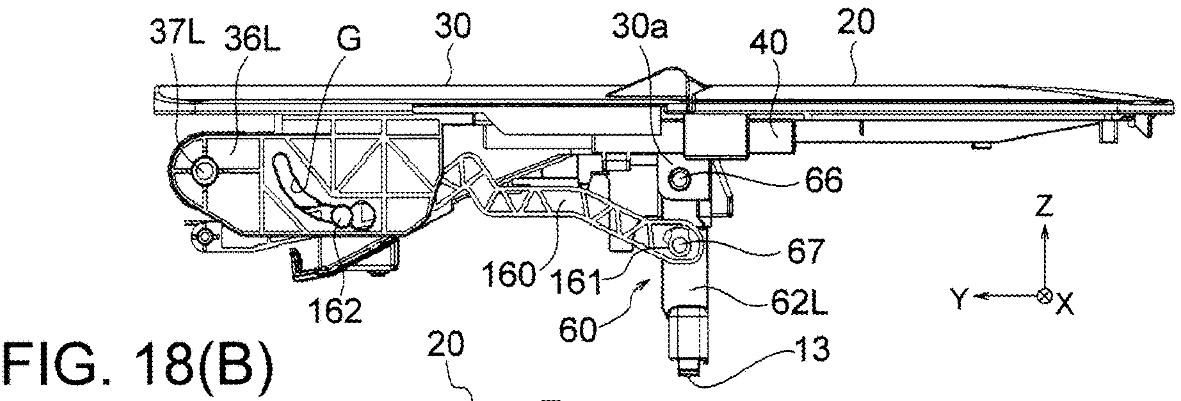
FIGS. 18(A), 18(B), and 18(C) are side views illustrating an interlocking state between the second cover and the head holder of the embodiment.

FIG. 18(A) is a side view illustrating an interlocking state between the second cover 30 and the head holder 60. In FIG. 18(A), both the first cover 20 and the second cover 30 are in the closing position.

As illustrated in FIG. 18(A), a link lever 160 is provided in the −X direction (leftward) of the head holder 60. A cam follower 162 that engages with a cam groove G formed in the side plate 36L is mounted on one end of the link lever 160. The other end of the link lever 160 is coupled to a coupling shaft 67 provided in the arm 62L.

With this configuration, the path of movement of the head holder 60 when the second cover 30 is opened and closed is controlled by the link lever 160 and the cam groove G.

A similar link lever 160 (including a cam follower 162) may also be provided in the +X direction (rightward) of the head holder 60, and the cam groove G may be provided in the side plate 36R. The link lever 160 and the cam groove G may be provided only on one side of the head holder 60 in the X direction (for example, in the −X direction) and may be operated in a cantilevered manner.

Figure 18B:
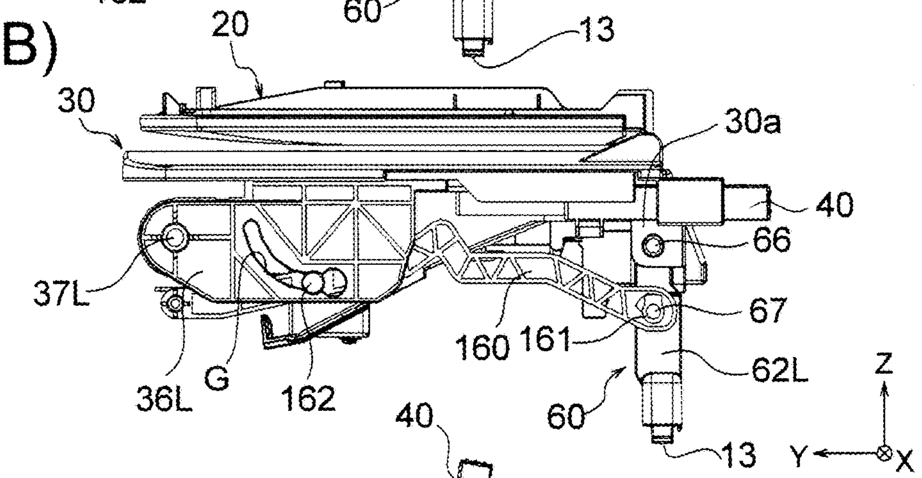

FIG. 18(B) is a side view illustrating a state in which the first cover 20 is rotated by 180 degrees from the state illustrated in FIG. 18(A). By rotating the first cover 20 by 180 degrees as illustrated in FIG. 18(B), the release lever 40 becomes operable. The head holder 60 does not move between the states illustrated in FIGS. 18(A) and 18(B).

Figure 18C:
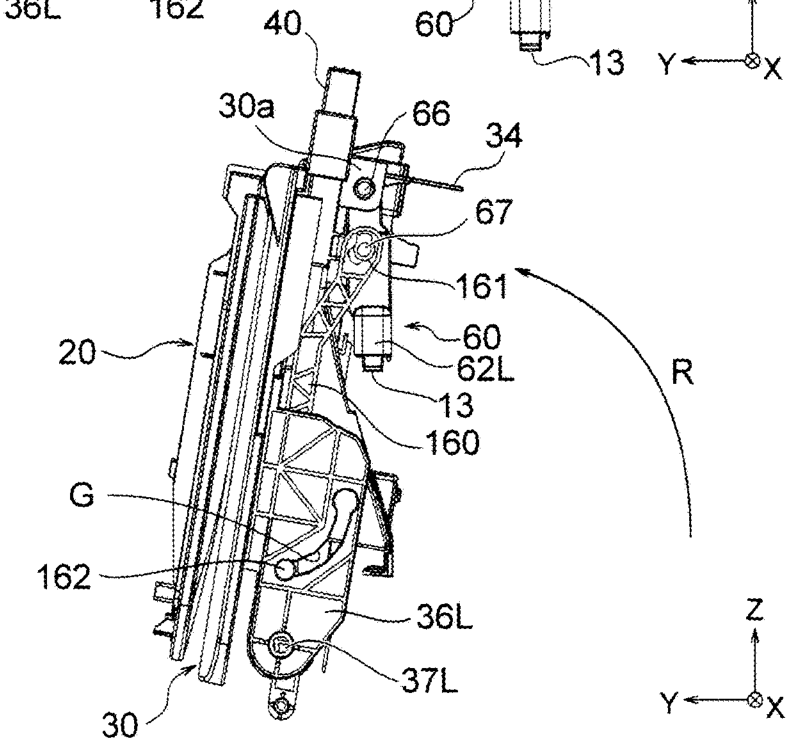

FIG. 18(C) is a side view illustrating a state in which the second cover 30 is rotated by 80 degrees from the state illustrated in FIG. 18(B). When the second cover 30 is rotated, the cam follower 162 of the link lever 160 moves from one end to the other end of the cam groove G in the side plate 36L.

Thus, the head holder 60 rotates about the rotation shaft 66 relative to the second cover 30 while maintaining the state in which the extending direction of the arms 62L and 62R is oriented in the Z direction (vertical direction).

That is, the head holder 60 (and the LED head 13 held by the head holder 60) rotates about the rotation shaft 66 and moves away from the wall portion 34 of the second cover 30 to approach the second coupling part (shafts 37L and 37R and holes 53*a* and 54*a*).

When the second cover 30 is closed (i.e., moves from the state of FIG. 18(C) to the state of FIG. 18(B)), the head holder 60 rotates about the rotation shaft 66 and moves away from the second coupling part (shafts 37L and 37R and holes 53*a* and 54*a*) of the second cover 30 to approach the wall portion 34.

<Toner Cartridge>

Figure 19A:
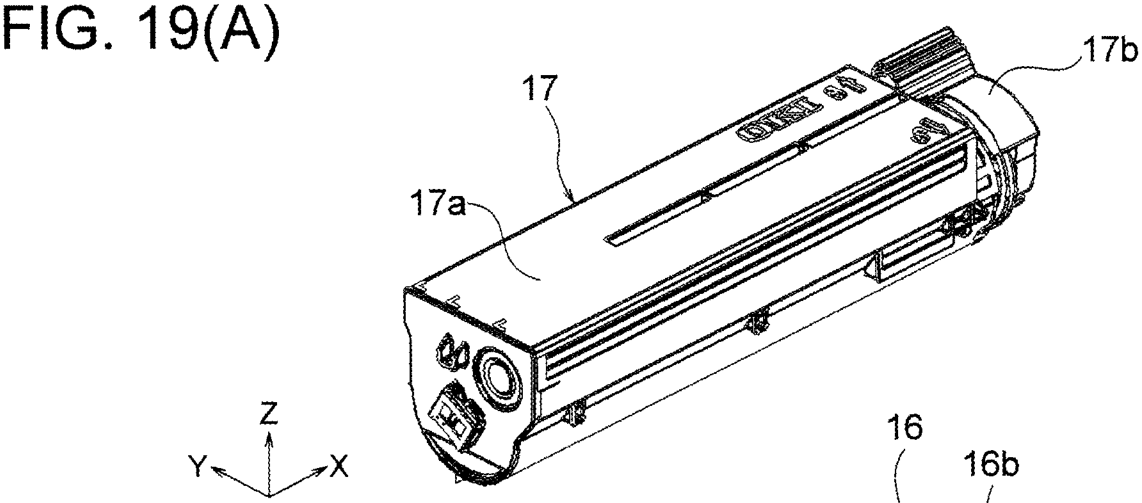
FIG. 19(A) is a top perspective view illustrating a toner cartridge of the embodiment.
Figure 19B:
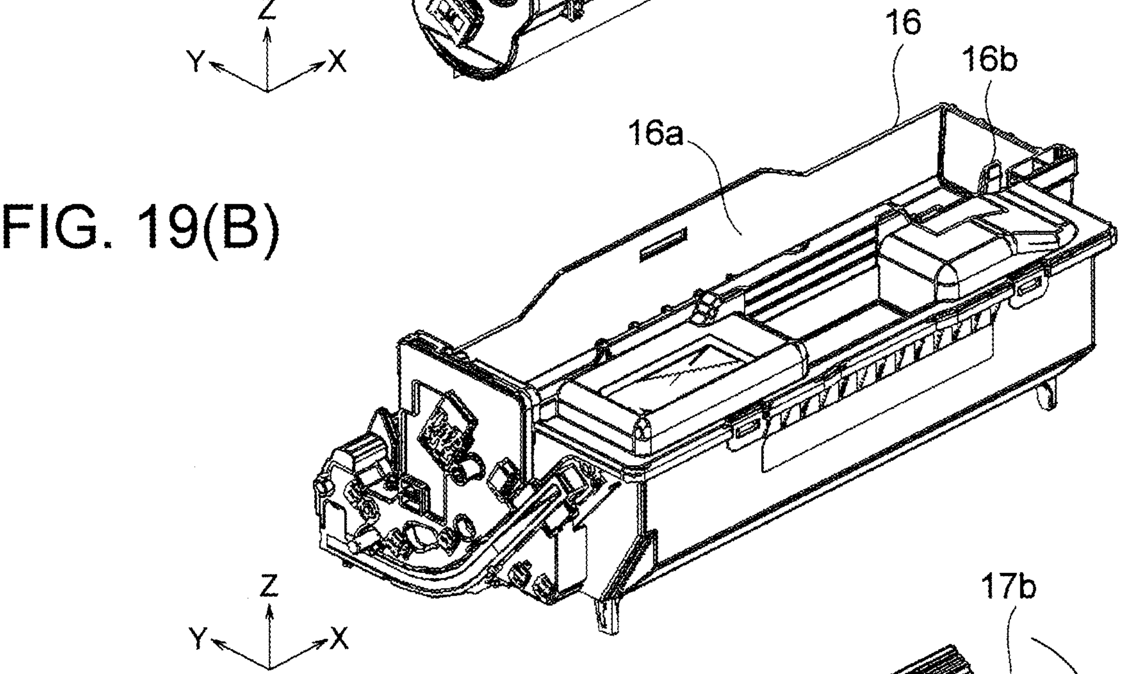
FIG. 19(B) is a top perspective view illustrating a unit body of an ID unit of the embodiment.
Figure 19C:
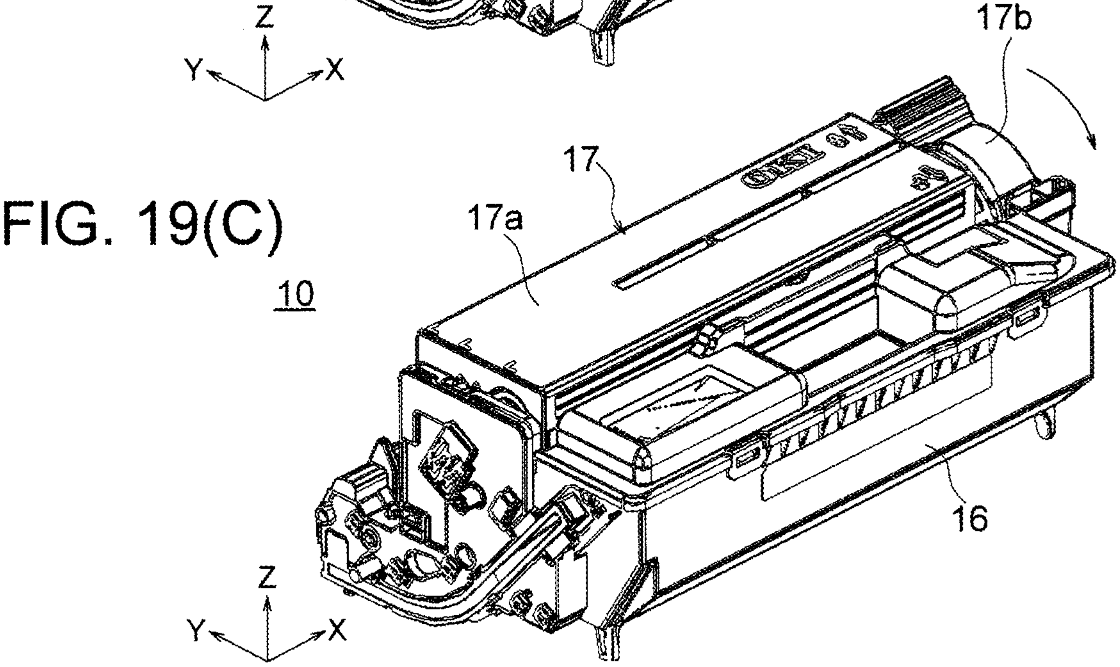
FIG. 19(C) is a top perspective view illustrating the ID unit.

Next, the toner cartridge 17 will be described. FIG. 19(A) is a perspective view illustrating the toner cartridge 17. FIG. 19(B) is a perspective view illustrating the unit body 16 of the ID unit 10. FIG. 19(C) is a perspective view illustrating the ID unit 10.

As illustrated in FIG. 19(A), the toner cartridge 17 has a toner container 17*a* that stores a toner and an operating lever 17*b* provided at one end portion (in this example, one end portion in the +X direction) of the toner container 17*a* in the X direction.

A toner supply port is provided at the bottom of the toner container 17*a*, and a shutter is provided inside the toner container 17*a* to open and close the toner supply port. The shutter is opened and closed by the operating lever 17*b*.

As illustrated in FIG. 19(B), the unit body 16 has a cartridge mounting portion 16*a* to which the toner cartridge 17(FIG. 19(A)) is mounted. Inside the cartridge mounting portion 16*a*, a fitting portion 16*b* is provided to engage with a fitting hole provided in the operating lever 17*b* of the toner cartridge 17.

As illustrated in FIG. 19(C), when the toner cartridge 17 is mounted in the cartridge mounting portion 16*a* (FIG. 19(B)) of the unit body 16, the fitting portion 16*b* (FIG. 19(B)) of the unit body 16 enters a fitting hole provided in the operating lever 17*b* of the toner cartridge 17.

When the operating lever 17*b* of the toner cartridge 17 is rotated from this state in the direction indicated by the arrow, the shutter in the toner container 17*a* opens the toner supply port to thereby allow the toner to be supplied from the toner container 17*a* into the unit body 16. By the rotation of the operating lever 17*b*, the fitting portion 16*b* is held so as not to be detached from the fitting hole of the operating lever 17*b*. Thus, the toner cartridge 17 is locked to the unit body 16.

When the toner cartridge 17 is detached from the unit body 16, the operating lever 17*b* is rotated in the direction opposite to the direction indicated by the arrow. Thus, the shutter in the toner container 17*a* closes the toner supply port and also releases the lock of the toner cartridge 17.

<Fixing Unit>

Figures 20A, 20B, 20C, 20D:
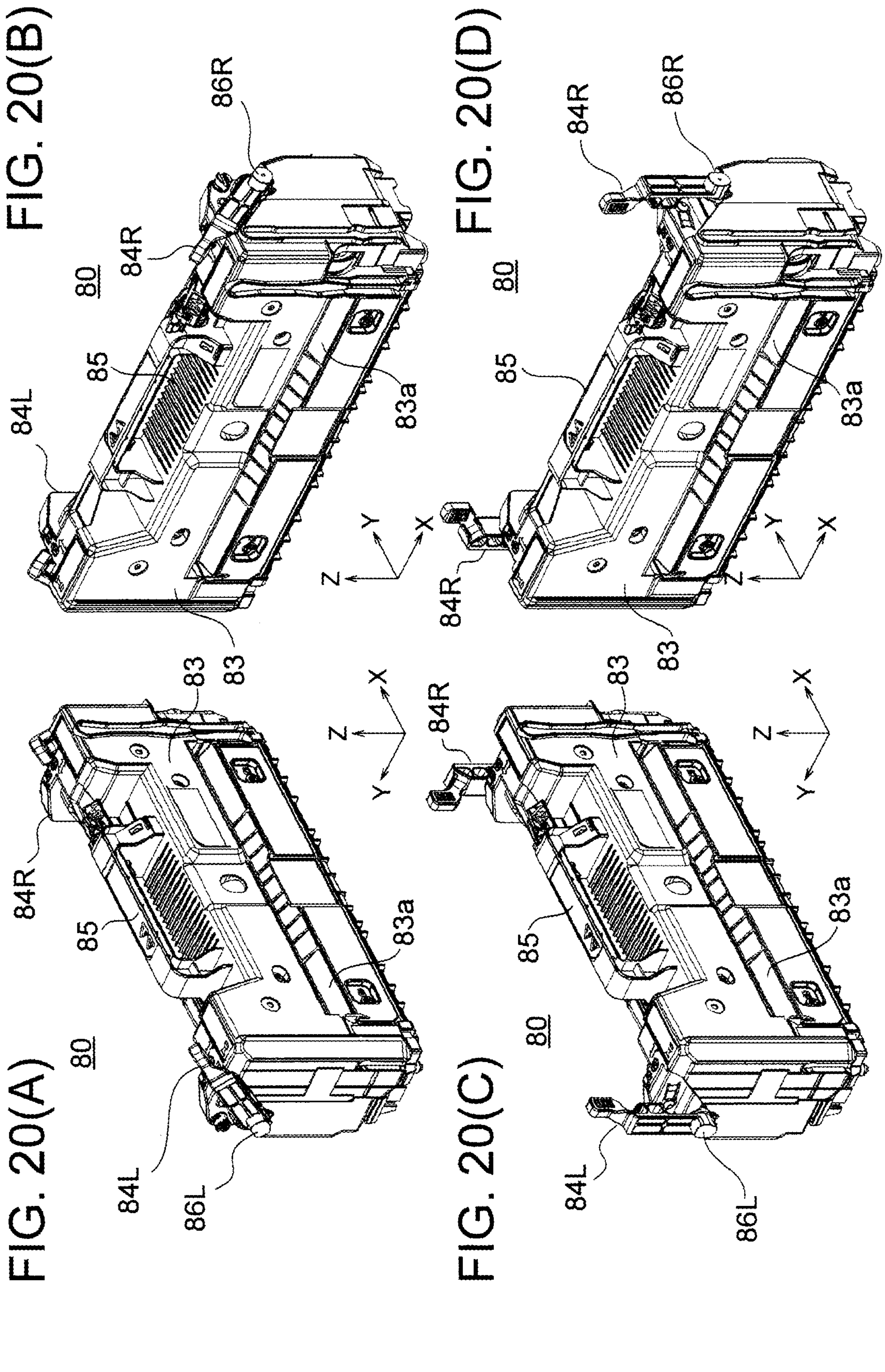
FIGS. 20(A) and 20(B) are top perspective views illustrating a fixing unit of the embodiment.
FIGS. 20(C) and 20(D) are top perspective views illustrating a state in which lock arms of the fixing unit are operated.

Next, the fixing unit 80 will be described. FIGS. 20(A) and 20(B) are perspective views illustrating the fixing unit 80. The fixing unit 80 has a unit casing 83 that houses the fixing roller 81 and the pressure roller 82 (FIG. 1), and a gripping part 85 provided in the +Z direction (upward) of the unit casing 83.

An inlet opening 83*a* for guiding the medium M into the unit casing 83 is formed in the −Y direction (forward) of the unit casing 83. A not-shown outlet opening for ejecting the medium M from the unit casing 83 is formed in the +Y direction (rearward) of the unit casing 83.

The unit casing 83 is also provided with lock arms 84L and 84R. The lock arms 84L and 84R are rotatable about rotation shafts 86L and 86R in the X direction, respectively, which are provided on both sides of the unit casing 83 in the X direction. The lock arms 84L and 84R are configured to be engageable with engagement portions (fixing unit engagement portions) which are provided in the housing 50 for fixing the fixing unit 80.

As illustrated in FIGS. 20(A) and 20(B), when the extending direction of the lock arms 84L and 84R is inclined at a predetermined angle (for example, 45 degrees) with respect to the Z direction, the lock arms 84L and 84R engage with the fixing unit engagement portions provided in the housing 50, and thus the fixing unit 80 is locked within the housing 50.

FIGS. 20(C) and 20(D) are perspective views illustrating a state in which the lock arms 84L and 84R are rotated from the state illustrated in FIGS. 20(A) and 20(B). As illustrated in FIGS. 20(C) and 20(D), when the user operates the lock arms 84L and 84R to cause the extending direction of the lock arms 84L and 84R to align with the Z direction, the engagement between the lock arms 84L and 84R and the fixing unit engagement portions in the housing 50 is released. Thus, the fixing unit 80 can be detached from the housing 50.

<Transfer Unit>

Figure 21A:
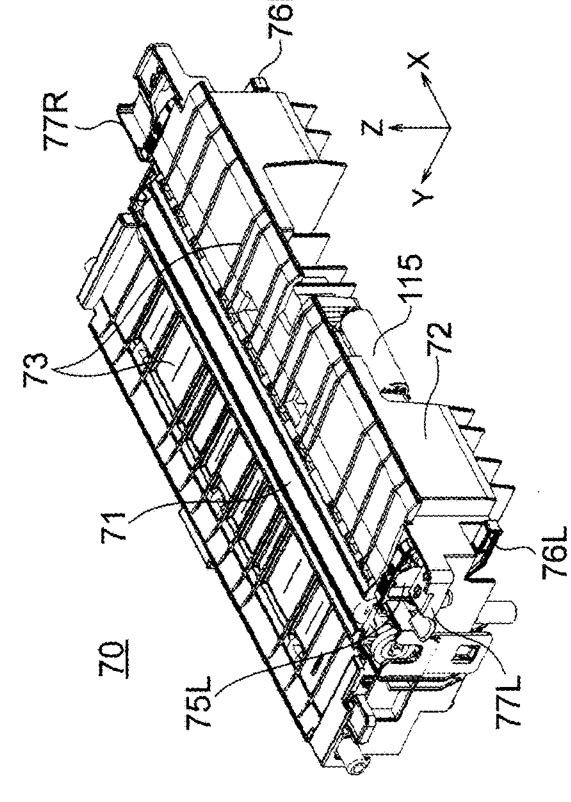
FIGS. 21(A) and 21(B) are top perspective views illustrating a transfer unit of the embodiment.
Figure 21B:
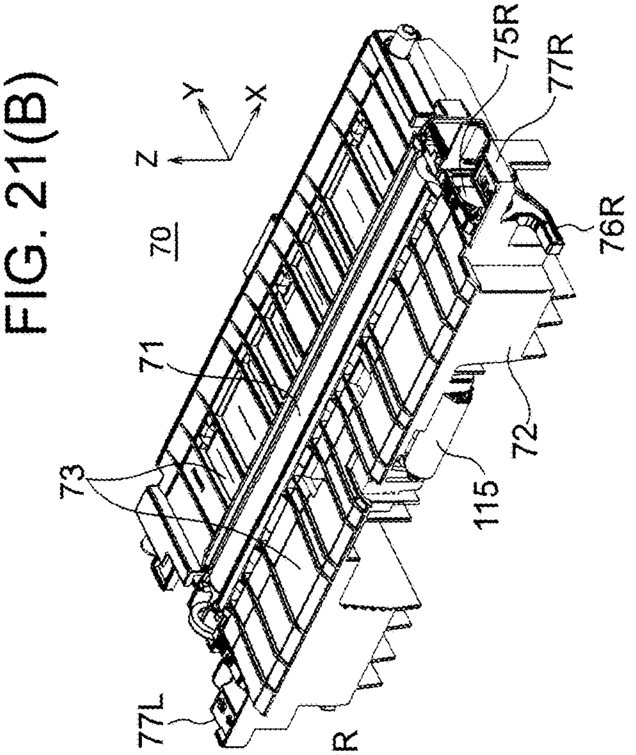

Next, the transfer unit 70 will be described. FIGS. 21(A) and 21(B) are perspective views illustrating the transfer unit 70. The transfer unit 70 has the transfer roller 71, described with reference to FIG. 1, and a frame 72 that holds the transfer roller 71. The surface (top surface) of the frame 72 in the +Z direction serves as a transport surface 73 on which the medium M is transported.

Handles 77L and 77R that the user grasps to detach the transfer unit 70 from the housing 50 are formed on both sides of the frame 72 in the X direction.

In addition, lock handles 75L and 75R are also disposed on both sides of the frame 72 in the X direction. The lock handles 75L and 75R are mounted onto the frame 72 so as to be rotatable about a rotation axis in the X direction. The lock handles 75L and 75R are provided with engagement pieces 76L and 76R that are engageable with engagement portions (transfer unit engagement portions) which are provided in the housing 50 for fixing the transfer unit 70.

As illustrated in FIGS. 21(A) and 21(B), the engagement pieces 76L and 76R of the lock handles 75L and 75R engage with the transfer unit engagement portions in the housing 50 when the extending direction of the engagement pieces 76L and 76R are parallel to the Y direction. In this case, the transfer unit 70 is locked within the housing 50.

Figure 21C:
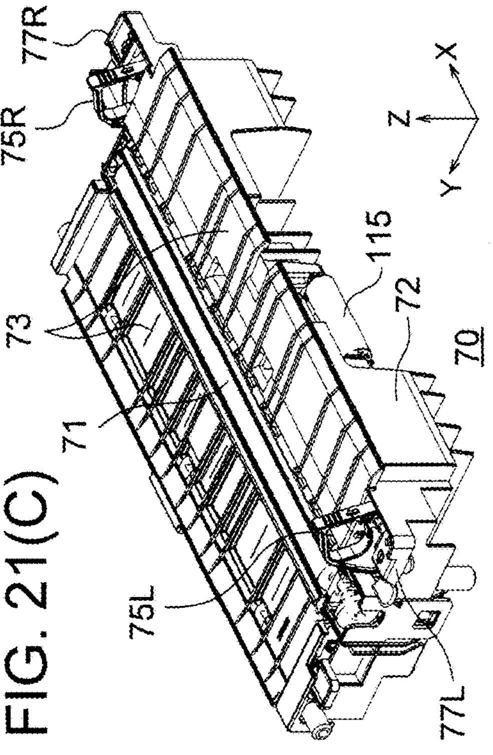
FIGS. 21(C) and 21(D) are top perspective views illustrating a state in which lock handles of the transfer unit are operated.
Figure 21D:
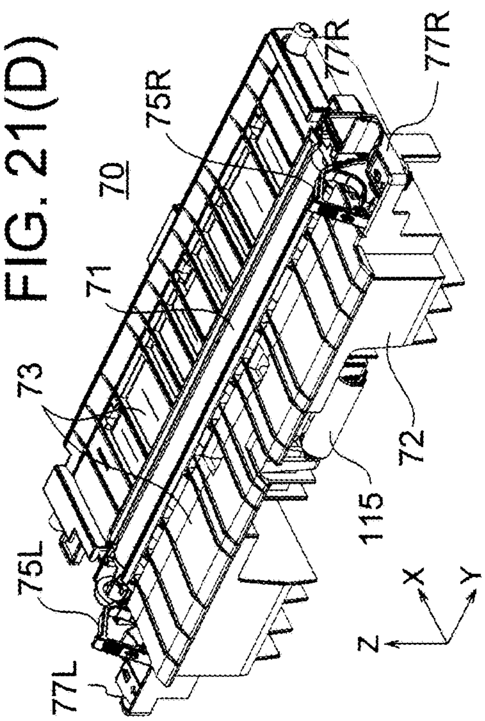

As illustrated in FIGS. 21(C) and 21(D), the engagement between the engagement pieces 76L and 76R and the transfer unit engagement portions in the housing 50 is released when the lock handles 75L and 75R are rotated by a predetermined angle. Thus, the transfer unit 70 can be detached from the housing 50.

<First Area and Second Area within Housing>

Figure 22A:
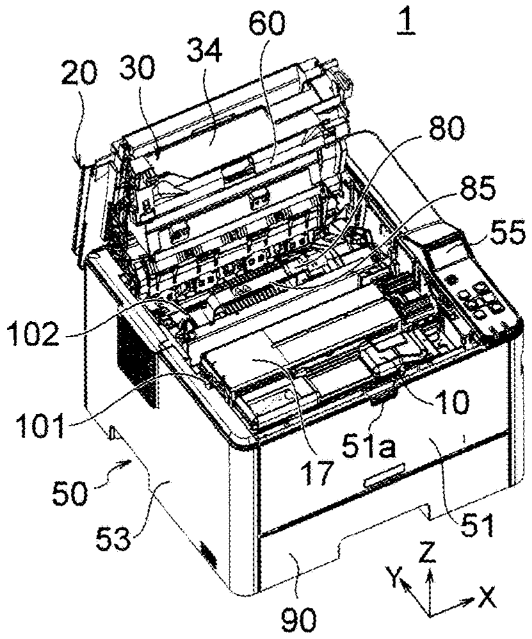
FIGS. 22(A) and 22(B) are perspective views illustrating a state in which the first cover and the second cover of the image forming apparatus of the embodiment are opened.
Figure 22B:
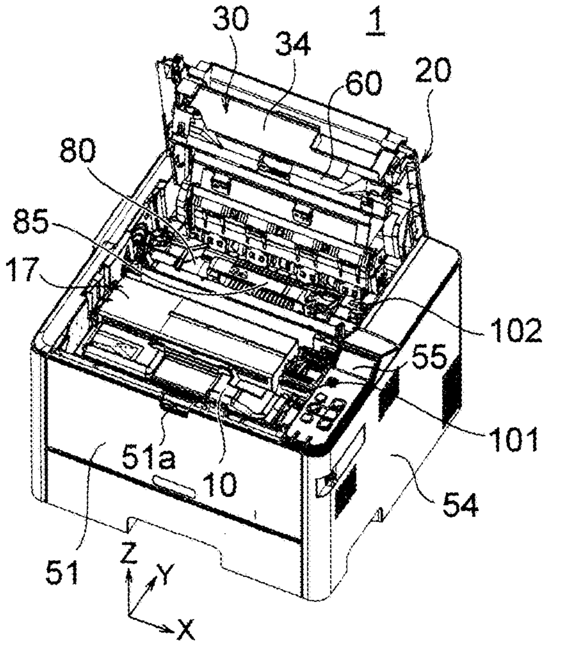

FIGS. 22(A) and 22(B) are perspective views illustrating a state of the image forming apparatus 1 in which the first cover 20 and the second cover 30 are opened. By opening the second cover 30, the first and second areas 101 and 102 within the housing 50 are opened, and thus the ID unit 10(including the toner cartridge 17) and the fixing unit 80 become accessible. In this state, these components can be attached and detached to and from the housing 50.

Figure 22C:
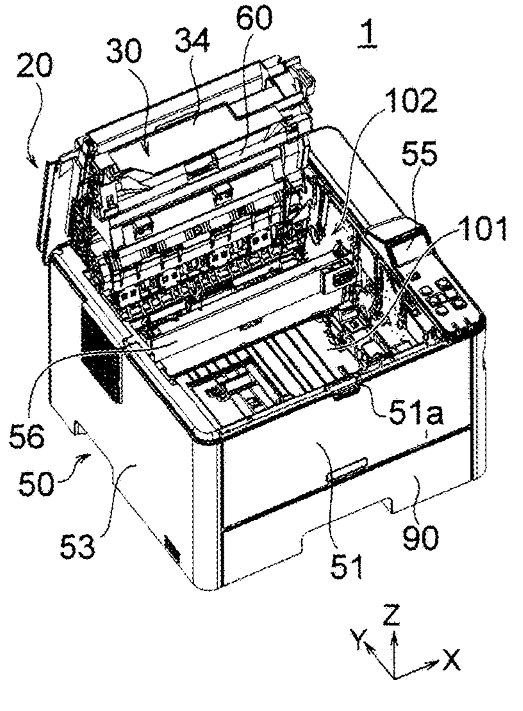
FIGS. 22(C) and 22(D) are perspective views illustrating a state in which the ID unit, the transfer unit and the fixing unit are detached.
Figure 22D:
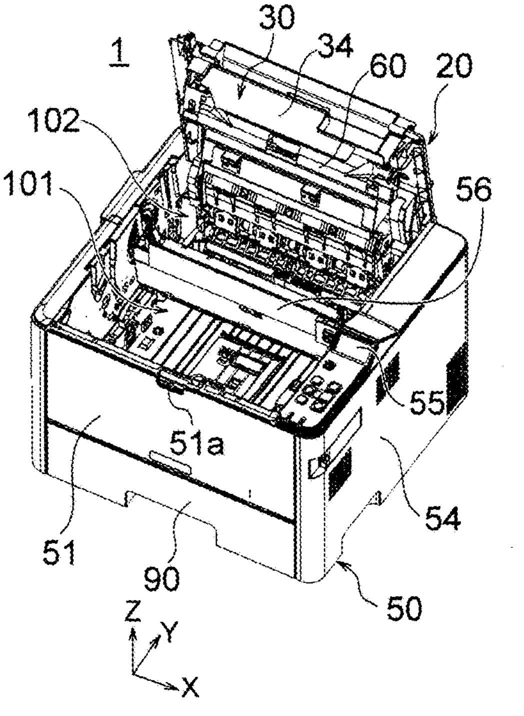

FIGS. 22(C) and 22(D) are perspective views illustrating a state of the image forming apparatus 1 in which the first cover 20 and the second cover 30 are opened, and the ID unit 10, the transfer unit 70 and the fixing unit 80 are detached. As described above, within the housing 50, a space in the −Y direction (forward) is the first area 101, while a space in the +Y direction (rearward) is the second area 102.

The lever holder 56 that holds the second lock lever 150 (FIGS. 10(A) to 10(C)) is disposed between the first area 101 and the second area 102.

It is most desirable that the first cover 20 and the second cover 30 do not protrude in the +Y direction (rearward) beyond the end portion (rear end portion) of the housing 50 in the +Y direction in a state where the second cover 30 is opened as illustrated in FIGS. 22(A) to 22(D).

For example, when a protrusion 52*a* (FIG. 7(A)) is provided on the rear cover 52 of the housing 50, it is most desirable that the first cover 20 and the second cover 30 do not protrude in the +Y direction (rearward) beyond the protrusion 52*a*.

There is a case where an operation manual or the like stipulates that, in relation to the installation of the image forming apparatus 1, a certain space must be provided in the +Y direction (rearward) of the image forming apparatus 1 in consideration of the heat from the fixing unit 80. In such case, it is most desirable that the first cover 20 and the second cover 30 do not protrude in the +Y direction (rearward) beyond the stipulated space.

<Printing Operation of Image Forming Apparatus>

Next, a printing operation of 41 the forming image apparatus 1 will be described with reference to FIG. 1. When a controller of the image forming apparatus 1 receives a print command and print data from a host device, the controller starts the printing operation (image forming operation).

When the printing operation starts, the pick-up roller 111, the feeding roller 112, and the separation roller 113 of the medium feeding section 110 rotate to feed the medium M stored in the medium cassette 90 one by one to the feeding transport path P1. In addition, the intermediate transport rollers 114 rotate to transport the medium M along the feeding transport path P1. Furthermore, the transport rollers 115 start rotating at predetermined timing, correct the skew of the medium M, and transport the medium M to the transfer unit 70 along the transfer transport path P2.

In the ID unit 10, a charging voltage, a developing voltage, and a supply voltage are applied to the charging roller 12, the developing roller 14, and the supply roller 15, respectively. The photosensitive drum 11 rotates, and the charging roller 12, the developing roller 14, and the supply roller 15 rotate along with the rotation of the photosensitive drum 11. The charging roller 12 uniformly charges the surface of the photosensitive drum 11. The LED head 13 emits to light to expose the uniformly charged surface of the photosensitive drum 11, and an electrostatic latent image is formed on the surface of the photosensitive drum 11.

The electrostatic latent image formed on the surface of the photosensitive drum 11 is developed with the toner adhering to the developing roller 14, and a toner image is formed on the surface of the photosensitive drum 11. When the toner image approaches the surface of the transfer roller 71 by the rotation of the photosensitive drum 11, a transfer voltage is applied to the transfer roller 71.

Thus, the toner image formed on the photosensitive drum 11 is transferred to the medium M passing through between the photosensitive drum 11 and the transfer roller 71. The medium M onto which the toner image is transferred is transported to the fixing unit 80 by the rotation of the photosensitive drum 11.

In the fixing unit 80, the fixing roller 81 and the pressure roller 82 rotate while forming a fixing nip, with the surface of the fixing roller 81 heated to a predetermined fixing temperature. When the medium M passes through the fixing nip between the fixing roller 81 and the pressure roller 82, heat and pressure are applied to the toner on the medium M, and thus the toner image is fixed to the medium M.

The medium M with the toner image fixed thereto is transported along the ejection transport path P3 via the ejection rollers 121 and 122 of the medium ejection section 120, and is ejected from the ejection port 123. The ejected medium M is loaded on the stacker portions 20S and 30S. In this way, the printing operation is completed.

<Attachment and Detachment of Toner Cartridge>

Next, attachment and detachment of the toner cartridge 17 will be described. In the state illustrated in FIG. 5(A), the first cover 20 and the second cover 30 of the image forming apparatus 1 are in the closing position, as described above. To detach the toner cartridge 17 from the housing 50, the user inserts its finger through the opening 51*a* of the front cover 51 and lifts the front end of the first cover 20.

Thus, the lock of the first cover 20 by the first lock lever 140 (FIGS. 8(A) and 8(B)) is released, and the first cover 20 is rotated by 180 degrees about the first coupling part (shafts 23L and 23R and holes 33L and 33R) to reach the opening position illustrated in FIG. 5(B).

By opening the first cover 20, the first area 101 (FIG. 1) in the housing 50 is opened, and the toner cartridge 17 becomes accessible. In this state, the operating lever 17*b* of the toner cartridge 17 is rotated to release the lock, and the toner cartridge 17 is detached from the unit body 16 of the ID unit 10.

In this state, the wall portion 34 is disposed on the second cover 30 side with respect to the first area 101 in which the toner cartridge 17 is housed. Thus, even when the toner cartridge 17 is detached, access to the second area 102, which is located behind the wall portion 34 (in the +Y direction), is restricted.

In addition, the second portion 35*b* (FIG. 3(C)) in the +X direction (on the right side) of the center of the plate 35 has a lower height than the center of the plate 35 as described above. Thus, the user can easily operate the operating lever 17*b* of the toner cartridge 17 in a state where the first cover 20 is opened and the second cover 30 is closed as illustrated in FIG. 5(B). Further, the user can easily insert its finger in the second portion 35*b* of the plate 35 and grasp the operating lever 17*b* to detach the toner cartridge 17.

In addition, in a state where the second cover 30 is closed, a gap between the first portion 35*a* (FIG. 3(C)) including the center of the plate 35 in the X direction and the ID unit 10 is narrow. Thus, it is difficult for the user to insert its finger into the gap. This prevents the ID unit 10 from being unintentionally detached (along with the toner cartridge 17) in a state where the second cover 30 closed.

When the toner cartridge 17 is to be mounted in the housing 50, the toner cartridge 17 is placed in the first area 101 within the housing 50, and the operating lever 17*b* is rotated to thereby lock the toner cartridge 17. Then, the first cover 20 is rotated from the opening position illustrated in FIG. 5(B) to the closing position illustrated in FIG. 5(A).

When the first cover 20 is rotated to the closing position, the locking claw 24(FIG. 8(B)) of the first cover 20 contacts the inclined surface S1 of the engagement portion 141 of the first lock lever 140, and thereby the first lock lever 140 moves in the +X direction resisting the urging force of the spring 145.

Once the locking claw 24 reaches the inclined surface S2 of the engagement portion 141 of the first lock lever 140, the first lock lever 140 moves in the −X direction due to the urging force of the spring 145, and thereby the locking claw 24 engages with the first lock lever 140. Thus, the first cover 20 is locked in the closing position.

<Attachment and Detachment of ID Unit>

Next, attachment and detachment of the ID unit 10 will be described. When the ID unit 10 is detached from the housing 50, the user rotates the first cover 20 to the opening position illustrated in FIG. 5(B) in the same manner as when the toner cartridge 17 is detached.

By rotating the first cover 20 to the opening position, the release lever 40 of the second cover 30 becomes operable, which allows the user to push in the release lever 40 (FIGS. 13(B) and 13(C)) in the +Y direction (rearward).

By pushing in the release lever 40, the second lock lever 150 moves in the +X direction (rightward), and thereby the engagement portions 152L and 152R (FIGS. 10(B) and 10(C)) of the second lock lever 150 separate from the locking portions 39L and 39R of the second cover 30. Thus, the lock of the second cover 30 is released.

Then, the user rotates the second cover 30 by 80 degrees around the second coupling part (shafts 37L and 37R and holes 53*a* and 54*a*), as illustrated in FIG. 5(C). The second cover 30 rotates in a state where the first cover 20 overlaps the second cover 30.

As illustrated in FIGS. 22(A) and 22(B), by opening the second cover 30, the first area 101 and the second area 102 (FIG. 1) within the housing 50 are opened. Thus, the ID unit 10 becomes accessible. In this state, the ID unit 10 is lifted up and detached from the housing 50.

When the ID unit 10 is to be mounted in the housing 50, the ID unit 10 is set to a predetermined mounting position in the housing 50, and then the second cover 30 is rotated from the opening position illustrated in FIG. 5(C) to the closing position illustrated in FIG. 5(B).

The release lever 40 (FIG. 13(B)) of the second cover 30 has been returned to its original position by the urging force of the spring 45. When the second cover 30 is rotated to the closing position, the locking portions 39L and 39R (FIGS. 10(B) and 10(C)) of the second cover 30 contact the respective inclined surfaces T of the engagement portions 152L and 152R of the second lock lever 150, and thereby the second lock lever 150 moves in the +X direction (rightward).

When the locking portions 39L and 39R pass through the inclined surfaces T, the second lock lever 150 moves in the −X direction (leftward) due to the urging force of the spring 155. Thus, the engagement portions 152L and 152R of the second lock lever 150 engage with the locking portions 39L and 39R of the second cover 30, thereby locking the second cover 30.

Then, the user rotates the first cover 20 from the opening position illustrated in FIG. 5(B) to the closing position illustrated in FIG. 5(A). The operation of rotating the first cover 20 to the opening position is performed in the same manner as when the toner cartridge 17 is mounted.

<Attachment and Detachment of Transfer Unit>

Next, attachment and detachment of the transfer unit 70 will be described. When the transfer unit 70 is detached from the housing 50, the user rotates the first cover 20 to the opening position illustrated in FIG. 5(B), and further rotates the second cover 30 to the opening position illustrated in FIG. 5(C), in the same manner as when the user detaches the ID unit 10. Then, the ID unit 10 is detached from the housing 50 as described above. The detachment of the ID unit 10 from the housing 50 makes the transfer unit 70 accessible.

In a state where the ID unit 10 is detached from the housing 50, the user operates the lock handles 75L and 75R (FIGS. 21(A) and 21(B)) of the transfer unit 70 to release the lock. Then, the user grasps the handles 77L and 77R and lifts the transfer unit 70 to detach the transfer unit 70 from the housing 50.

When the transfer unit 70 is to be mounted in the housing 50, the transfer unit 70 is placed in the housing 50 and is locked by operating the lock handles 75L and 75R, and then the ID unit 10 is placed in the housing 50. Then, the second cover 30 is rotated from the opening position illustrated in FIG. 5(C) to the closing position illustrated in FIG. 5(B), and further the first cover 20 is rotated from the opening position illustrated in FIG. 5(B) to the closing position illustrated in FIG. 5(A), in the same manner as when the ID unit 10 is mounted.

<Attachment and Detachment of Fixing Unit>

Next, attachment and detachment of the fixing unit 80 will be described. When the fixing unit 80 is detached from the housing 50, the user rotates the first cover 20 to the opening position illustrated in FIG. 5(B), and further rotates the second cover 30 to the opening position illustrated in FIG. 5(C), in the same manner as when the ID unit 10 is detached.

By opening the second cover 30, the first area 101 and the second area 102 (FIG. 1) in the housing 50 are opened, and thereby the fixing unit 80 becomes accessible. In this state, the user operates the lock arms 84L and 84R (FIGS. 20(A) to (D)) of the fixing unit 80 to release the lock. Then, the user grasps the gripping part 85, and lifts the fixing unit 80 to detach the fixing unit 80 from the housing 50.

When the fixing unit 80 is to be mounted in the housing 50, the fixing unit 80 is placed in the housing 50, and then the lock arms 84L and 84R are operated to lock the fixing unit 80. Then, the second cover 30 is rotated to the closing position illustrated in FIG. 5(B), and further the first cover 20 is rotated to the closing position illustrated in FIG. 5(A), in the same manner as when the ID unit 10 is mounted.

<Removal of Jammed Medium>

Figure 23A:
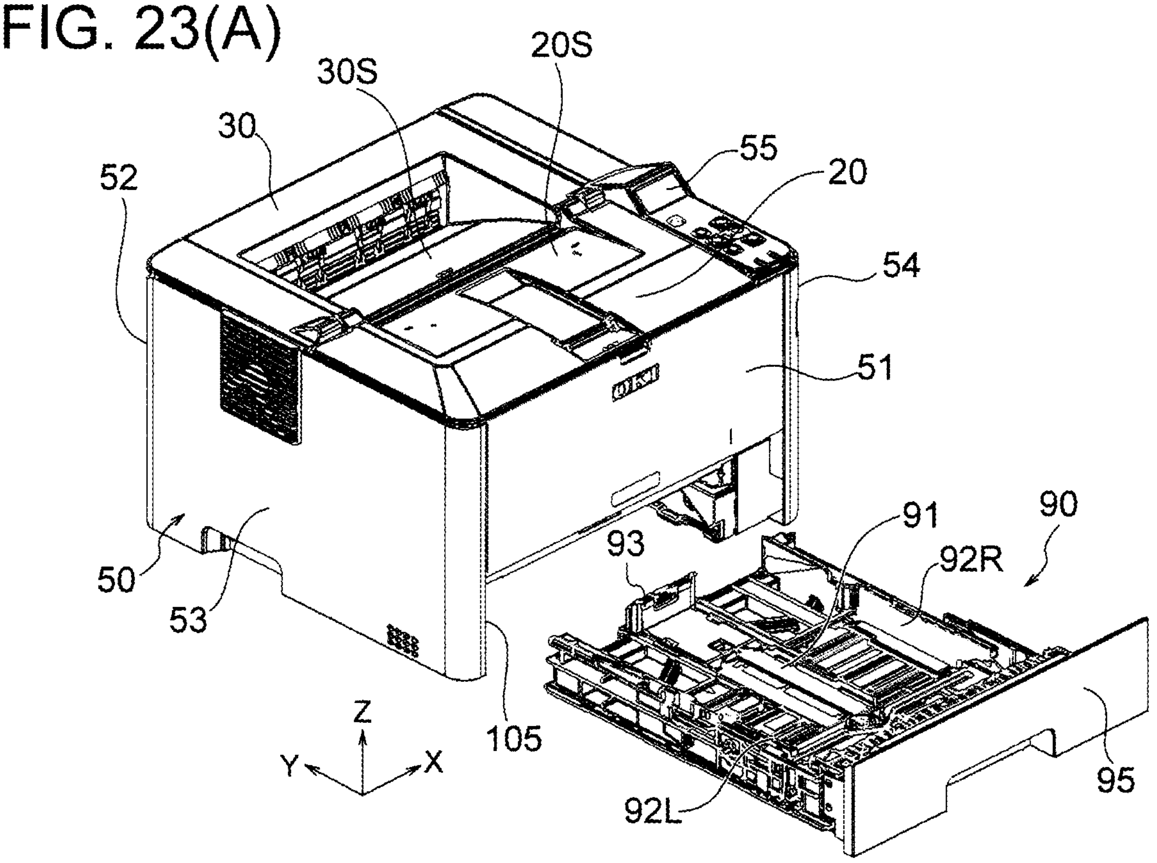
FIG. 23(A) is a perspective view illustrating a state in which a medium cassette is detached from the image forming apparatus of the embodiment.
Figure 23B:
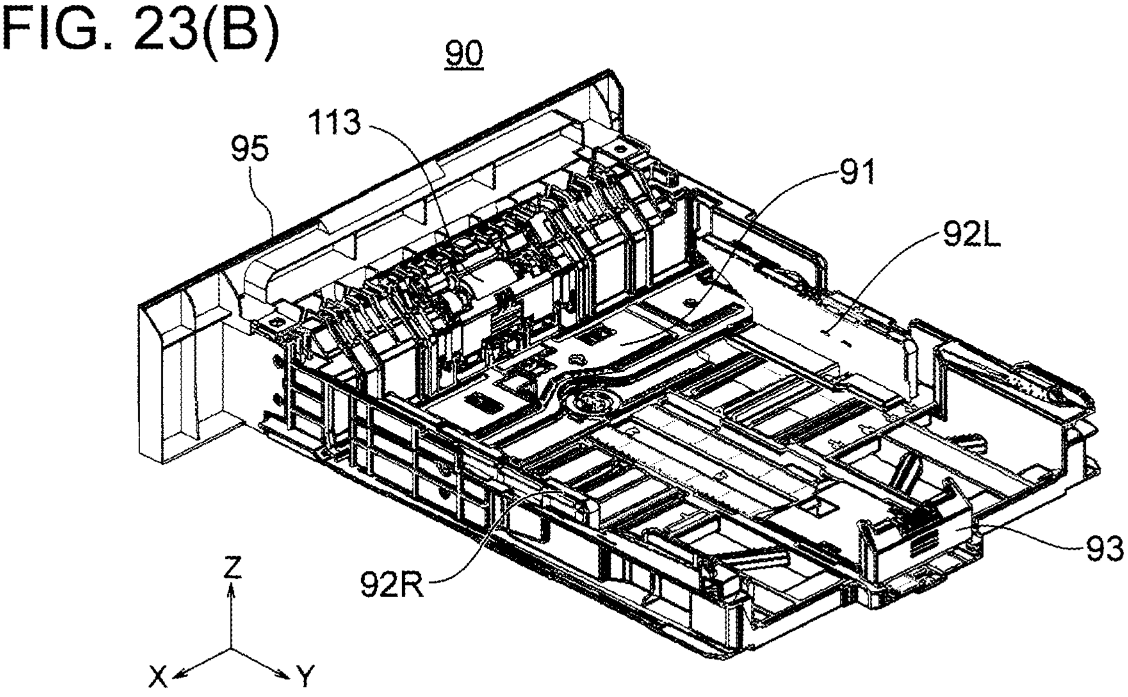
FIG. 23(B) is a perspective view illustrating the medium cassette.

Next, the removal of a jammed medium from the medium transport path P will be described. FIG. 23(A) is a perspective view illustrating a state in which the medium cassette 90 is detached from the image forming apparatus 1. FIG. 23(B) is a top perspective view of the medium cassette 90. The separation roller 113 described with reference to FIG. 1 is disposed at an end portion (front end portion) of the medium cassette 90 in the −Y direction.

In the event that jamming of the medium M occurs in the medium transport path P from the pick-up roller 111 to the intermediate transport rollers 114, the transport path (feeding transport path P1) from the pick-up roller 111 to the intermediate transport rollers 114 is opened by detaching the medium cassette 90 from the housing 50. This allows the jammed medium M to be removed.

In the event that jamming of the medium M occurs in the medium transport path P from the intermediate transport rollers 114 to the fixing roller 81, the transport path (part of the feeding transport path P1 and the transfer transport path P2) from the intermediate transport rollers 114 to the fixing roller 81 is opened by detaching the ID unit 10 from the housing 50 as described above. This allows the jammed medium M to be removed.

Further, in the event that jamming of the medium M occurs in the medium transport path P from the fixing roller 81 to the ejection rollers 122, the transport path (ejection transport path P3) from the fixing roller 81 to the ejection rollers 122 is opened by detaching the fixing unit 80 from the housing 50 as described above. This allows the jammed medium M to be removed.

In addition, in the event that jamming of a medium M occurs in a transport path from the ejection rollers 122 to the re-transport rollers 134 of the re-transport mechanism 130 during double-sided printing, the transport path from the ejection rollers 122 to the re-transport roller 134 (return transport path P4) is opened by opening the first cover 20 and the second cover 30 and detaching the ID unit 10, the transfer unit 70 and the fixing unit 80 as illustrated in FIGS. 23(A) and 23(B). This allows the jammed medium M to be removed.

Here, the attachment and detachment (replacement) of the toner cartridge 17, the ID unit 10, the transfer unit 70, and the fixing unit 80, as well as the removal of the medium M have been described, but this embodiment can be applied to replacement, maintenance and the like of other components.

<Effects of Embodiment>

As described above, the image forming apparatus 1 as the medium transport apparatus of the embodiment includes the housing 50 in which the medium transport path P is provided, the first component (for example, the toner cartridge 17) and the second component (for example, the ID unit 10) which are disposed inside the housing 50, the first cover 20 covering the first area 101 in which the first component is housed, the second cover 30 covering the second area 102 in which the second component is housed, the first coupling part (shafts 23L and 23R and holes 33L and 33R) coupling the first cover 20 and the second cover 30 and supporting the first cover 20 so that the first cover 20 is openable and closable with respect to the first area 101, and the second coupling part (shafts 37L and 37R and holes 53*a* and 54*a*) coupling the housing 50 and the second cover 30 and supporting the second cover 30 so that the second cover 30 is openable and closable with respect to the second area 102. The second cover 30 has the wall portion 34 located between the first area 101 and the second area 102 in the state where the first cover 20 is opened and the second cover 30 is closed. When the first cover 20 is opened, the first component in the first area 101 is attachable and detachable while access to the second area 102 is restricted by the wall portion 34. When the second cover 30 is opened, the first component in the first area 101 and the second component in the second area 102 are attachable and detachable.

With this configuration, the first cover 20 can be opened to perform replacement of the first component or the like, and the second cover 30 can be opened to perform replacement of the second component or the like. As compared to a configuration with a single cover, the configuration of the embodiment requires less space for opening and closing the covers 20 and 30. Therefore, even when the image forming apparatus 1 is installed in a narrow space, there is no need to pull out the image forming apparatus 1 into a wider space for replacement of components or the like. Thus, the burden on the user can be reduced. In addition, in a state where only the first cover 20 is opened, access to the second area 102 is restricted by the wall portion 34, and thus it is possible to prevent the user from accessing a wrong member.

The first cover 20 is rotatable about the first rotation axis (shafts 23L and 23R), the second cover 30 is rotatable about the second rotation axis (shafts 37L and 37R) parallel to the first rotation axis, and the arrangement direction of the first cover 20 and the second cover 30 is perpendicular to both rotation axes. Thus, the configuration of the first cover 20 and the second cover 30 can be made compact, and the image forming apparatus 1 can be installed in a narrower space.

The second component is disposed adjacent to the medium transport path P, and the medium transport path P becomes accessible by opening the second cover 30 and detaching the second component. Thus, by opening the second cover 30 and detaching the second component, a jammed medium M can be removed.

The first area 101 is located on one side (for example, on the +Z side) with respect to the medium transport path P (for example, transfer transport path P2), and the second area 102 is disposed on the same side as the first area 101 with respect to the medium transport path P and adjacent to the first area 101. Thus, components that perform processing on the transported medium M can be disposed in the first area 101 and the second area 102.

The lock part (second lock lever 150 and locking portions 39L and 39R) is provided to lock the second cover 30 in a state where the second cover 30 is closed. The release lever 40 as a lock-release part is provided to release the lock of the second cover 30 by the lock part. By opening the first cover 20, the release lever 40 becomes operable. Thus, the second cover 30 can only be opened when necessary, and incorrect operation can be prevented.

The second cover 30 is provided with the locking portions 39L and 39R, and the housing 50 is provided with the second lock lever 150 serving as the lock lever that engages with the locking portions 39L and 39R, in a state where the second cover 30 closed. When the release lever 40 as the lock-release part is operated, the release lever 40 moves the second lock lever 150 to release the engagement between the second lock lever 150 and the locking portions 39L and 39R. Thus, the release of the lock of the second cover 30 that is performed by operating the release lever 40 can be achieved with a simple configuration.

The ID unit 10 (image forming unit) and the fixing unit 80 are disposed within the housing 50 of the image forming apparatus 1, and the toner cartridge 17 as the developer container is mounted to the ID unit 10. The second cover 30 supports the LED head 13 as the exposure section that faces the ID unit 10 in a state where the second cover 30 is closed. The second lock lever 150 is located between the fixing unit 80 and the LED head 13 in a state where the second cover 30 closed, and the release lever 40 is operated from the toner cartridge 17 side. Thus, the configuration necessary for locking the second cover 30 and releasing the lock of the second cover 30 can be disposed within a narrow space of the housing 50.

The first coupling part (shafts 23L and 23R and holes 33L and 33R) is provided at a position protruding from surfaces (top panels 21 and 31) of the first cover 20 and the second cover 30. The housing 50 is provided with the display section 55*a* that is disposed adjacent to the first coupling part (shafts 23L and 23R and holes 33L and 33R) in the width direction of the medium M and protrudes from the surface (top surface 54*b*) of the housing 50 toward the same side as the first coupling part. Consequently, the protruding portions of the image forming apparatus 1 can be provided at one location in the transport direction (Y direction) of the medium M, and thus the image forming apparatus 1 can be made compact.

The housing 50 has the ejection port 123 as the ejection section for ejecting the medium M having passed through the medium transport path P. The first cover 20 and the second cover 30 have the first stacker portion 20S and the second stacker portion 30S where the medium M ejected from the ejection port 123 is placed. The first stacker portion 20S is located downstream of the second stacker portion 30S in the ejection direction of the medium M from the ejection port 123. When the first cover 20 is opened, the first cover 20 overlaps the second cover 30 so that the first stacker portion 20S and the second stacker portion 30S face each other. Thus, the second cover 30 can be opened in a state where the first cover 20 overlaps the second cover 30, and thus a space required around the image forming apparatus 1 can be reduced.

The first coupling part (shafts 23L and 23R and holes 33L and 33R) is disposed on the outer side with respect to the first stacker portion 20S and the second stacker portion 30S in the width direction of the medium M (X direction). Thus, the first cover 20 can overlap the second cover 30 without interfering with the first coupling part, and thus the space required around the image forming apparatus 1 can be reduced.

The head holder 60 serving as the holder is rotatably mounted on the second cover 30, and the LED head 13 serving as the exposure section is held by the head holder 60. The link lever 160 serving as the link mechanism causes the head holder 60 and the LED head 13 to approach the wall portion 34 when the second cover 30 is closed. Further, when the second cover 30 is opened, the link lever 160 moves the head holder 60 and the LED head 13 away from the wall portion 34 to approach the second coupling part (shafts 37L and 37R and holes 53*a* and 54*a*). Thus, the orientation of the head holder 60 can remain constant, regardless of whether the second cover 30 is opened or closed, and thus the LED head 13 supported by the head holder 60 can be protected.

The first component is the toner cartridge 17 as the developer container, and the second component includes the photosensitive drum 11 as the image bearing body. The second cover 30 supports the LED head 13 as the exposure section facing the photosensitive drum 11 when the second cover 30 is closed. In a state where the second cover 30 is opened, the first cover 20 is located on the side opposite to the LED head 13 with respect to the second cover 30. Thus, the first cover 20 can overlap the second cover 30 without interfering with the LED head 13.

The opening/closing angle of the second cover 30 is less than 90 degrees in a state where the second cover 30 is opened. The first cover 20 and the second cover 30 do not protrude beyond the housing 50 in the +Y direction (rearward) or do not protrude beyond a specified space set behind the housing 50 in the +Y direction (rearward). Thus, the space required behind the image forming apparatus 1 can be minimized.

Various aspects of the present disclosure are collectively described below as appendixes.

(Appendix 1)

A medium transport apparatus, comprising:

an apparatus body in which a medium transport path is provided;

a first component and a second component that are disposed in the apparatus body;

a first cover covering a first area in which the first component is housed;

a second cover covering a second area in which the second component is housed;

a first coupling part coupling the first cover and the second cover and supporting the first cover so that the first cover is openable and closable with respect to the first area; and a second coupling part coupling the apparatus body and the second cover and supporting the second cover so that the second cover is openable and closable with respect to the second area, wherein the second cover has a wall portion located between the first area and the second area in a state where the first cover is opened and the second cover is closed, wherein when the first cover is opened, the first component in the first area is attachable and detachable while access to the second area is restricted by the wall portion, and wherein when the second cover is opened, the first component in the first area and the second component in the second area are attachable and detachable.

(Appendix 2)

The medium transport apparatus according to appendix 1, wherein the first cover is rotatable about a first rotation axis, wherein the second cover is rotatable about a second rotation axis parallel to the first rotation axis, and wherein an arrangement direction of the first cover and the second cover is perpendicular to the first rotation axis and the second rotation axis.

(Appendix 3)

The medium transport apparatus according to appendix 1 or 2, wherein the second component is disposed adjacent to the medium transport path, and wherein the medium transport path is made accessible by opening the second cover and detaching the second component.

(Appendix 4)

The medium transport apparatus according to any one of appendixes 1 to 3, wherein the first area is located on one side with respect to the medium transport path, and wherein the second area is located on a same side as the first area with respect to the medium transport path and adjacent to the first area.

(Appendix 5)

The medium transport apparatus according to any one of appendixes 1 to 4, further comprising:

a lock part that locks the second cover in a state where the second cover is closed; and a lock-release part that releases the lock of the second cover by the lock part, wherein the lock-release part is made operable by opening the first cover.

(Appendix 6)

The medium transport apparatus according to appendix 5, wherein the lock part comprises:

a locking portion provided in the second cover, and a lock lever provided in the apparatus body, the lock lever engaging with the locking portion in a state where the second cover is closed, and wherein when the lock-release part is operated, the lock-release part moves the lock lever to release engagement between the lock lever and the locking portion.

(Appendix 7)

The medium transport apparatus according to appendix 6, wherein the medium transport apparatus is an image forming apparatus, wherein the apparatus body is provided with an image forming unit that forms an image on a medium and a fixing unit that fixes the image on the medium, wherein a developer container is mounted on the image forming unit, wherein the second cover supports an exposure section that faces the image forming unit in a state where the second cover is closed, wherein the lock lever is disposed between the fixing unit and the exposure section in a state where the second cover is closed, and wherein the lock-release part is operable from the developer container side to release lock of the second cover by the lock lever.

(Appendix 8)

The medium transport apparatus according to any one of appendixes 1 to 7, wherein the first coupling part protrudes from surfaces of the first cover and the second cover, and wherein the apparatus body has a display section that is adjacent to the first coupling part in a width direction of a medium and protrudes from a surface of the apparatus body toward a same side as the first coupling part.

(Appendix 9)

The medium transport apparatus according to any one of appendixes 1 to 8, wherein the apparatus body has an ejection section through which a medium having passed through the medium transport path is ejected, wherein the first cover has a first stacker portion where the medium ejected from the ejection section is placed, wherein the second cover has a second stacker portion where the medium ejected from the ejection section is placed, wherein the first stacker portion is disposed downstream of the second stacker portion in an ejection direction of the medium ejected from the ejection section, and wherein when the first cover is opened, the first cover overlaps the second cover so that the first stacker portion and the second stacker portion face each other.

(Appendix 10)

The medium transport apparatus according to appendix 9, wherein the first coupling part is disposed on an outer side of the first stacker portion and the second stacker portion in a width direction of the medium.

(Appendix 11)

The medium transport apparatus according to any one of appendixes 1 to 10, further comprising:

a holder rotatably mounted to the second cover;

an exposure section held by the holder; and a link mechanism that moves the holder and the exposure section to approach the wall portion when the second cover is closed, the link mechanism moving the holder and the exposure section away from the wall portion to approach the second coupling part when the second cover is opened.

(Appendix 12)

The medium transport apparatus according to any one of appendixes 1 to 11, wherein the medium transport apparatus is an image forming apparatus, wherein the first component is a developer container, wherein the second component includes an image bearing body, wherein the second cover supports an exposure section that faces the image bearing body of the second component in a state where the second cover is closed, and wherein the first cover is located on a side opposite to the exposure section in the second cover in a state where the second cover is opened.

(Appendix 13)

The medium transport apparatus according to any one of appendixes 1 to 12, wherein an opening/closing angle of the second cover is less than 90 degrees, and wherein when the first cover side is defined as a forward side and the second cover side is defined as a rearward side, the first cover and the second cover do not protrude rearward beyond the apparatus body or do not protrude rearward beyond a specified space set behind the apparatus body, in a state where the second cover is opened.

Although the desirable embodiments have been specifically described above, the present disclosure is not limited to the embodiments described above, and various modifications or changes can be made to these embodiments. The respective embodiments described above can be combined as appropriate.

Although a printer is described here as an example of the image forming apparatus, the image forming apparatus of this embodiment can also be applied to copiers, facsimiles, Multi-Function Peripherals (MFPs), and the like.

DESCRIPTION OF REFERENCE CHARACTERS

1: image forming apparatus (medium transport apparatus), 10: ID unit (image forming unit, second component), 11: photosensitive drum (image bearing body), 12: charging roller (charging member), 13: LED head (exposure head, exposure section), 14 developing roller (developer bearing body), 15: supply roller (supplying roller), 16: unit body, 17: toner cartridge (first component), 20: first cover, 20S: first stacker portion, 23L, 23R: shaft (first coupling part), 24: locking claw, 30: second cover, 30S: second stacker portion, 33L, 33R: hole (first coupling part), 34: wall portion, 37L, 37R: shaft (second coupling part), 39L: locking portion (first locking portion), 39R: locking piece (second locking portion), 40: release lever (lock-release part), 41: pressing portion, 45: spring (first urging member), 50: housing (apparatus body), 51: front cover, 52: rear cover, 53, 54: side cover, 53*a*, 54*a*: hole (second coupling part), 54*b*: upper end surface (surface), 55: operation panel, 55*a*: display section, 60: head holder (holder), 64L, 64R: spring (pressing member), 66: rotation axis, 67: coupling shaft, 70: transfer unit, 73: transport surface (medium transport surface), 77L: grip, 77R: grip, 80: fixing unit, 90: medium cassette (medium container), 101: first area, 102: second area, 110: medium feeding section, 120: medium ejection section, 123: ejection port (ejection section), 130: re-transport mechanism, 140: first lock lever, 145: spring (first urging member), 150: second lock lever (lock lever), 152L, 152R: engagement portion, 153: contact portion, 155: spring (second urging member), 160: link lever (link member), P: medium transport path, P1: feeding transport path, P2: transfer transport path, P3: ejection transport path, P4: return transport path.

What is claimed is:

1. A medium transport apparatus, comprising:

an apparatus body in which a medium transport path is provided;

a first component and a second component that are disposed in the apparatus body;

a first cover covering a first area in which the first component is housed;

a second cover covering a second area in which the second component is housed;

a first coupling part coupling the first cover and the second cover and supporting the first cover so that the first cover is openable and closable with respect to the first area; and a second coupling part coupling the apparatus body and the second cover and supporting the second cover so that the second cover is openable and closable with respect to the second area, wherein the second cover has a wall portion located between the first area and the second area in a state where the first cover is opened and the second cover is closed, wherein when the first cover is opened, the first component in the first area is attachable and detachable while access to the second area is restricted by the wall portion, and wherein when the second cover is opened, the first component in the first area and the second component in the second area are attachable and detachable.

2. The medium transport apparatus according to claim 1, wherein the first cover is rotatable about a first rotation axis, wherein the second cover is rotatable about a second rotation axis parallel to the first rotation axis, and wherein an arrangement direction of the first cover and the second cover is perpendicular to the first rotation axis and the second rotation axis.

3. The medium transport apparatus according to claim 1, wherein the second component is disposed adjacent to the medium transport path, and wherein the medium transport path is made accessible by opening the second cover and detaching the second component.

4. The medium transport apparatus according to claim 1, wherein the first area is located on one side with respect to the medium transport path, and wherein the second area is located on a same side as the first area with respect to the medium transport path and adjacent to the first area.

5. The medium transport apparatus according to claim 1, further comprising:

a lock part that locks the second cover in a state where the second cover is closed; and a lock-release part that releases the lock of the second cover by the lock part, wherein the lock-release part is made operable by opening the first cover.

6. The medium transport apparatus according to claim 5, wherein the lock part comprises:

a locking portion provided in the second cover, and a lock lever provided in the apparatus body, the lock lever engaging with the locking portion in a state where the second cover is closed, and wherein when the lock-release part is operated, the lock-release part moves the lock lever to release engagement between the lock lever and the locking portion.

7. The medium transport apparatus according to claim 6, wherein the medium transport apparatus is an image forming apparatus, wherein the apparatus body is provided with an image forming unit that forms an image on a medium and a fixing unit that fixes the image on the medium, wherein a developer container is mounted on the image forming unit, wherein the second cover supports an exposure section that faces the image forming unit in a state where the second cover is closed, wherein the lock lever is disposed between the fixing unit and the exposure section in a state where the second cover is closed, and wherein the lock-release part is operable from the developer container side to release lock of the second cover by the lock lever.

8. The medium transport apparatus according to claim 1, wherein the first coupling part protrudes from surfaces of the first cover and the second cover, and wherein the apparatus body has a display section that is adjacent to the first coupling part in a width direction of a medium and protrudes from a surface of the apparatus body toward a same side as the first coupling part.

9. The medium transport apparatus according to claim 1, wherein the apparatus body has an ejection section through which a medium having passed through the medium transport path is ejected, wherein the first cover has a first stacker portion where the medium ejected from the ejection section is placed, wherein the second cover has a second stacker portion where the medium ejected from the ejection section is placed, wherein the first stacker portion is disposed downstream of the second stacker portion in an ejection direction of the medium ejected from the ejection section, and wherein when the first cover is opened, the first cover overlaps the second cover so that the first stacker portion and the second stacker portion face each other.

10. The medium transport apparatus according to claim 9, wherein the first coupling part is disposed on an outer side of the first stacker portion and the second stacker portion in a width direction of the medium.

11. The medium transport apparatus according to claim 1, further comprising:

a holder rotatably mounted to the second cover;

an exposure section held by the holder; and a link mechanism that moves the holder and the exposure section to approach the wall portion when the second cover is closed, the link mechanism moving the holder and the exposure section away from the wall portion to approach the second coupling part when the second cover is opened.

12. The medium transport apparatus according to claim 1, wherein the medium transport apparatus is an image forming apparatus, wherein the first component is a developer container, wherein the second component includes an image bearing body, wherein the second cover supports an exposure section that faces the image bearing body of the second component in a state where the second cover is closed, and wherein the first cover is located on a side opposite to the exposure section in the second cover in a state where the second cover is opened.

13. The medium transport apparatus according to claim 1, wherein an opening/closing angle of the second cover is less than 90 degrees, and wherein when the first cover side is defined as a forward side and the second cover side is defined as a rearward side, the first cover and the second cover do not protrude rearward beyond the apparatus body or do not protrude rearward beyond a specified space set behind the apparatus body, in a state where the second cover is opened.

* * * * *